(12) United States Patent
Rohrbaugh et al.

(10) Patent No.: US 6,955,834 B2
(45) Date of Patent: Oct. 18, 2005

(54) LONG LASTING COATINGS FOR MODIFYING HARD SURFACES AND PROCESSES FOR APPLYING THE SAME

(75) Inventors: Robert Henry Rohrbaugh, Hamilton, OH (US); Alan Scott Goldstein, Blue Ash, OH (US); Michael Ray McDonald, Middletown, OH (US); Helen Frances O'Connor, Loveland, OH (US); Heather Anne Liddle, Cincinnati, OH (US); John Michael Jensen, Wyoming, OH (US); Nabil Yaqub Sakkab, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 162 days.

(21) Appl. No.: 10/386,292

(22) Filed: Mar. 11, 2003

(65) Prior Publication Data

US 2003/0180466 A1 Sep. 25, 2003

Related U.S. Application Data

(63) Continuation of application No. 09/828,014, filed on Apr. 6, 2001, now abandoned.
(60) Provisional application No. 60/265,059, filed on Jan. 30, 2001.

(51) Int. Cl.$^7$ ................................................. B05D 1/12
(52) U.S. Cl. ..................... 427/180; 427/203; 427/204; 427/205; 427/372.2; 427/402; 427/407.1; 427/409; 427/421
(58) Field of Search ................. 427/180, 181, 427/203, 204, 205, 372.2, 402, 407.1, 407.2, 407.3, 408, 409, 421, 202, 201, 379

(56) References Cited

U.S. PATENT DOCUMENTS 4,260,654 A * 4/1981 Baldi .......................... 427/253

4,315,958 A * 2/1982 Peiffer et al. ................ 427/214

(Continued)

FOREIGN PATENT DOCUMENTS

| DE | 19719948 A | 11/1998 |
| EP | 358101 | 5/1990 |

(Continued)

OTHER PUBLICATIONS

Laporte Industries, Inc., Date of publication unknown but may before date of application, Leicestershire, U.K.

Primary Examiner—Elena Tsoy
(74) Attorney, Agent, or Firm—Laura R. Grunzinger; Kim William Zerby; Steven W. Miller

(57) ABSTRACT

Materials for coating, coating compositions, methods and articles of manufacture comprising a nanoparticle system or employing the same to impart surface modifying benefits for all types of inanimate hard surfaces are disclosed. In some embodiments, dispersement of nanoparticles in a suitable carrier medium allows for the creation of coating compositions, methods and articles of manufacture that create multi-use benefits to modified hard surfaces. These surface modifications can produce long lasting or semi-permanent multi-use benefits that include at least one of the following improved surface properties: wetting and sheeting, quick drying, uniform drying, soil removal, self-cleaning, anti-spotting, anti-soil deposition, cleaner appearance, enhanced gloss, enhanced color, minor surface defect repair, smoothness, anti-hazing, modification of surface friction, release of actives and transparency, relative to hard surfaces unmodified with such nanoparticle systems. Actively curing the coating composition on the hard surfaces, including, but not limited to by radiative heating the air surrounding the hard surface with the coating thereon can be used to increase the durability of the hard surface coating.

32 Claims, 2 Drawing Sheets

U.S. PATENT DOCUMENTS

| | | | | |
|---|---|---|---|---|
| 4,374,158 A | * | 2/1983 | Taniguchi et al. | 427/41 |
| 4,500,444 A | * | 2/1985 | Beekman | 516/112 |
| 4,591,449 A | | 5/1986 | Goedhart et al. | |
| 4,597,886 A | | 7/1986 | Goedhart et al. | |
| 5,296,288 A | * | 3/1994 | Kourtides et al. | 442/178 |
| 5,429,867 A | | 7/1995 | McCarthy et al. | |
| 5,552,083 A | * | 9/1996 | Watanabe et al. | 516/31 |
| 5,853,809 A | * | 12/1998 | Campbell et al. | 427/407.1 |
| 6,020,419 A | | 2/2000 | Brock et al. | |
| 6,225,434 B1 | * | 5/2001 | Sadvary et al. | 528/29 |

FOREIGN PATENT DOCUMENTS

| | | | |
|---|---|---|---|
| EP | 368101 | * | 5/1990 |
| EP | 0732387 A1 | | 9/1996 |
| EP | 083947 A2 | | 4/1998 |
| GB | 1 376379 | | 12/1974 |
| GB | 2 303373 A | | 2/1997 |
| JP | 03-169540 | | 7/1991 |
| JP | 04-353438 | | 12/1992 |
| JP | 96053558 A | | 2/1996 |
| RU | 1216862 | * | 12/1991 |
| WO | WO 99/00457 A1 | | 1/1999 |
| WO | WO 00/000554 A1 | | 1/2000 |
| WO | WO 01/27236 A1 | | 4/2001 |
| WO | WO 01/32820 A1 | | 5/2001 |

* cited by examiner

LONG LASTING COATINGS FOR MODIFYING HARD SURFACES AND PROCESSES FOR APPLYING THE SAME

CROSS-REFERENCE TO RELATED APPLICATIONS

This application is a continuation of U.S. Ser. No. 09/828,014, filed Apr. 6, 2001, now abandoned which claims the benefit of the filing dates of PCT application Ser. No. US00/16349, filed Jun. 14, 2000, and U.S. Provisional patent application Ser. No. 60/265,059, filed Jan. 30, 2001.

FIELD OF THE INVENTION

The present invention relates to coatings, compositions, methods and articles of manufacture comprising a nanoparticle system or employing the same to impart surface modifying benefits for all types of inanimate hard surface applications.

The use of non-photoactive nanoparticles allows for the creation of coatings, compositions, methods and articles of manufacture that create multi-use benefits to modified hard surfaces. These surface modifications can produce durable, long lasting or semi-permanent multi-use benefits that include at least one of the following improved surface properties: wetting and sheeting, quick drying, uniform drying, soil removal, self-cleaning, anti-spotting, anti-soil deposition, cleaner appearance, enhanced gloss, enhanced color, minor surface defect repair, smoothness, anti-hazing, modification of surface friction, release of actives, and transparency

BACKGROUND OF THE INVENTION

There have been many problems associated with developing hard surface coatings that provide a beneficial layer with the desirable properties and which minimize the disadvantages, such as a limit to single use protection, insufficient coverage, roughness and/or flaking of coating during use, or in contrast, the inability to remove once applied (when a more temporary coating is desired), a limit on surfaces that can be modified, photoactive damage and degradation of the surface.

The current approach to solving the coating problem is with the use of surfactants, film-forming polymer coatings, clay-containing-film-forming polymer coatings and photoactive inorganic metal oxide coatings. However, the substantivity of the film-forming polymers (e.g. alkoxylated silicones, poly(N-vinyl-2-pyrrolidones, poly(N-vinylimidazoles, diblock copolymers of poly(ethylene oxide) and poly(lactide)) is poor such that its wetting/sheeting effect is short-lived, with spotting/residue negatives returning within 1–2 rinses, exposures to the elements (e.g., rain, etc.), or conditions (e.g., water in a shower). Elevating the levels of polymers is not the solution to this problem. This is especially evident on automobile surfaces, residential windows, building exteriors, shower units and dishware where elevated levels of polymers result in unacceptable residue problem. In the case of clay-containing, film-forming polymer coatings, the nanoparticles are rheology agents for the formulations and do not themselves impart the benefit disclosed. One example of this approach is disclosed in U.S. Pat. No. 5,429,999, titled "Organoclay Compositions Containing Two Or More Cations And One Or More Organic Anions", wherein preparation and use in non-aqueous systems of an organophilic clay gellant is used in a non-aqueous fluid system such as paints, inks, and coatings to provide improved rheological properties. Other related patents include: U.S. Pat. No. 5,785,749, titled "Method For Producing Rheological Additives And Coating Compositions Incorporating Same"; U.S. Pat. No. 5,780,376, titled "Organoclay Compositions"; U.S. Pat. No. 5,739,087, Titled "Organoclay Products Containing A Branched Chain Alkyl Quaternary Ammonium Ion"; U.S. Pat. No. 5,728,764, titled "Formulations Including Improved Organoclay Compositions"; and U.S. Pat. No. 6,036,765, titled "Organoclay Compositions And Method Of Preparation".

Another approach to this problem is disclosed in U.S. Pat. No. 4,597,886, titled "Dishwashing Compositions", wherein an inclusion of an effective level of a layered clay (e.g. a synthetic hectorite) in an enzymatic dishwashing composition is introduced to reduce the formation of spots and films on the cleaned objects. U.S. Pat. No. 4,591,448, titled "Dishwashing Compositions", discloses the use of a layered clay in a non-enzymatic dishwashing composition with a reduced pH of 9–11 to provide for a reduction of spot and film formation on the cleaned articles. See also U.S. Pat. No. 4,591,449. EP. Pat. No. 139,330 B1, titled "Rinse Aid" discloses the use of a layered clay as a rinse aid or rinse component for the aqueous rinsing step of a machine dishwashing process to provide anti-spotting benefits. In the abovementioned dishware care patents, the layered clay is introduced in the machine dishwashing detergent or rinse aide as a single-use application to prevent spotting and film formation during that particular wash cycle. These patents do not disclose a nanoparticle coating system requirement which is preventative in nature, unlike the present invention. Furthermore, they do not disclose multi-use benefits (such as, anti-spotting, anti-hazing, soil removal and minor surface defect repair) without additional treatment between uses.

The photoactive metal oxide approach using nanoparticles, such as zinc oxide ($ZnO_2$) and titanium dioxide ($TiO_2$), have serious limitations and harmful deleterious surface effects to overcome. The potential of using $TiO_2$ to functionalize hard surfaces (1) is limited to surfaces exposed to outdoor levels of UV and (2) requires special surface safety precautions to protect against photoactivated damage mechanisms. In addition, $TiO_2$ is difficult to apply to said surfaces and often requires professional treatment of the surface.

In the case of $TiO_2$ thin films, an approach taken in JP. Pat. No. 11181339 A2, titled "Hydrophilic Coating Composition", discloses a room-temperature-settable coating composition comprising an aqueous fluid containing photocatalytic titanium oxide particles having a particle diameter of 1–100 nm and tin oxide particles having a particle diameter of 1–100 nm and having a pH of 8–12 or a pH of 0–5, and a coating film which exhibits hydrophilicity when it is formed on a substrate and irradiated with ultraviolet rays at a wavelength of 200–400 nm and, and the photocatalytic titanium oxide is photoexcited. Other related patents disclosing methods and articles of use for the abovementioned titanium oxide coating composition include JP. Pat. No. 11172239 A2, titled "Hydrophilic Member, Method For Hydrophilization/Hydrophilicity Retention Of Surface Of Member, And Hydrophilic Coating Composition"; JP. Pat. No. 10297436 A2, titled "Manufacture Of Mirror For Vehicle With Improved Rainy Weather Visibility"; JP. Pat. No. 10046759 A2, titled "Roof Material Having Ice-Snow Sticking Preventive Performance, JP. Pat. No. 09056549 A2, titled "Anti-Fogging Mirror"; JP. Pat. No. 00128672 A2, titled "Ceramic Ware And Its Production"; JP. Pat. No. 00096800 A2, titled "Antifouling Building Material And Manufacture Thereof"; JP. Pat. No. 11300303 A2, titled "Cleaning Method Of Composite Material And Self-Cleaning Composite Material Mechanism"; JP. Pat. No. 10237431 A2, titled "Member With Ultrawater-Repellent Surface"; JP. Pat. No. 10212809 A2, titled "Building Material For External Wall"; JP. Pat. No. 09230107 A2, titled "Anti-Fogging Glass Lens And Its Anti-Fogging Method"; and JP. Pat. No. 09228072 A2, titled "Outdoor Member". In the abovementioned patents, the hydrophilic $TiO_2$ film can cause photo- and chemical-degradation of organic undercoats, and any rubber or plastic it comes into contact with, and requires professional means of application and treatment.

U.S. Pat. No. 4,164,509, titled "Process For Preparing Finely Divided Hydrophobic Oxide Particles" discloses a process for preparing hydrophobic finely divided particles of oxides of metals and/or oxides of silicon by chemically bonding hydrocarbon radicals to the surface of the oxide particles.

It is apparent that there is a continuing need in order to improve the various properties of all hard surfaces, including but not limited to fiberglass, plastics, metals, glass, ceramic, wood, stone, concrete, asphalt, mineral, and painted surfaces, via a coating composition, method of use and article of manufacture which would result in hard surfaces having one or more of the following highly desirable modified surface properties such as improved surface wetting and sheeting, quick drying, uniform drying, soil removal, self-cleaning, anti-spotting, anti-soil deposition, cleaner appearance, enhanced gloss, enhanced color, minor surface defect repair, improved smoothness, anti-hazing properties, modification of surface friction, release of actives, reduced damage to abrasion and improved transparency. There is also a continuing need that these modified surface benefits be made longer lasting than the approach made by the polymer patents or semi-permanent to be more responsive to consumer applications than the approach that utilizes photoactivated coatings alone (e.g. $TiO_2$).

Nanoparticles have been used for a number of purposes in general coatings, but not for the abovementioned benefits. One example is disclosed in U.S. Pat. No. 4,173,480, titled "Photographic Sheet With Synthetic Hectorite Antistatic Additive As Sizing Or Backcoat", wherein a polymer film base is coated with a synthetic hectorite clay, specifically Laponite S™. The binder is gelatin, starch or carboxy methylcellulose. The primary benefit here is to impart antistatic properties to the surface. In the present invention, the binder is not required to apply the nanoparticle to the surface.

Another example is disclosed in U.S. Pat. No. 4,868,048, titled "Conductive Sheet Material Having An Aqueous Conductive Composition, wherein certain fractions (i.e., neighborite) are removed from synthetic hectorite before use thereof as a coating with a non-epoxy binder. The primary benefit here is to impart conduction of electric charge to the surface. In the present invention, the binder is not required to apply the nanoparticle to the surface.

Another example is disclosed in JP. Pat. No. 8053558 A2, titled "Anti-Fog Synthetic Resin Film For Agriculture", wherein colloidal alumina, colloidal silica, anionic surfactant, organic electrolyte and an inorganic layered compound form a film that exhibits sustained anti-fog properties at low- and high-temperatures. Another example is disclosed in JP. Pat. No. 04353438 A2, titled "Transparent Plastic Films With Good Dew And Blocking Preventing Effects", discloses Li-Mg-Na silicate layers on 1 side of the films useful for greenhouses, book covers, card holders, etc. See also, EP 0732387 titled, "Antifogging agent composition and agricultural film coated therewith".

Another example is disclosed in U.S. Pat. No. 4,786,558, titled "Composite Film And Antistatic Composite Film Comprising A Swellable Inorganic Silicate", where the inorganic nanoparticle is modified by treating it with various ions to provide a composite film with antistatic benefits comprising a swellable inorganic silicate.

Another example is disclosed in W.O. Pat. 99/00457 Al, titled "Coating Agent For Reducing The Soiling Process Of Facades", wherein the invention relates to the preparation of a system used for reducing the soiling process of building facades. Here the layered silicate is disclosed for its use as a gellant and is not responsible for the reduction of surface soiling benefits alone.

Another approach is disclosed in U.S. Pat. No. 5,853,809, entitled "Scratch Resistant Clearcoats Containing Surface Reactive Microparticles and Method Therefor" issued to Campbell, et al. This patent is directed to clearcoat coating compositions that, after application, comprise the outermost layer on automotive body panels. Reactive inorganic microparticles are added to the coating composition to improve scratch resistance.

Another approach taken is disclosed in U.S. Pat. No. 6,020,419, titled "Transparent Coating Compositions Containing Nanoscale Particles And Having Improved Scratch Resistance", wherein specific combinations of properties in coatings, such as transparency and wear resistance, may be obtained by using nanoparticles.

The present invention relates to materials, coatings, compositions, methods, and articles of manufacture that provide some important hard surface multi-use benefits that can be made long lasting or semi-permanent. These multi-use benefits include at least one of the following: improved surface wetting and sheeting, quick drying, uniform drying, soil removal, self-cleaning, anti-spotting, anti-soil deposition, cleaner appearance, enhanced gloss, enhanced color, minor surface defect repair, improved smoothness, anti-hazing properties, modification of surface friction, release of actives, reduced damage to abrasion, and improved transparency (the latter in the case of surfaces such as glass and the like, particularly after such surfaces are soiled or contacted with water) relative to transparent surfaces that are not treated with the materials, coatings, or coating composition, and anti-fogging in the case of surfaces (such as mirrors) that are designed to reflect.

SUMMARY OF THE INVENTION

In one embodiment of the present invention there is provided a material for coating a hard surface. The material for coating a hard surface can comprise a plurality of non-photoactive nanoparticles, or it can comprise a hard surface coating composition. Such a coating composition may comprise: (a) an effective amount of non-photoactive nanoparticles; (b) optionally a surfactant; (c) optionally having associated to said nanoparticle surface a quantity of one or more functionalized surface molecules exhibiting properties selected from the group consisting of hydrophilic, hydrophobic and mixtures thereof; (d) optionally one or more adjunct ingredients; and (e) optionally a suitable carrier medium.

In another embodiment of the present invention, there is provided a method of applying a substantially clear coating to a hard surface comprising: applying a material comprising an effective amount of non-photoactive nanoparticles to the hard surface; and, actively curing the material to form a coating on the hard surface.

In another embodiment of the present invention there is provided a method of using a coating composition by (a) mixing said nanoparticles in suitable carrier medium to form said coating composition; (b) optionally mixing said nanoparticles dispersed in suitable carrier medium with adjunct ingredients to form said coating composition; (c) optionally mixing said nanoparticles dispersed in suitable carrier medium with surfactant to form said coating composition; (d) optionally mixing said nanoparticles dispersed in suitable carrier medium with adjunct ingredients and surfactant to form said coating composition; (e) applying said coating composition to a hard surface; (f) allowing said coating composition to dry, or drying the coating composition; and (g) optionally repeating any of steps (a) through (f) as needed.

The drying step can comprise air drying in ambient conditions, or it can comprise actively drying the coating composition by utilizing any technology known for accelerating the drying process. It has been found the heat drying the hard surface coating composition can greatly increase the durability of the hard surface coating.

In another embodiment of the present invention there is provided an article of manufacture comprising an applicator, such as a spray dispenser, an immersion container, a hose spray dispenser attachment, a fabric or a sponge; further comprising (a) a coating composition, wherein said coating composition is in the physical form selected from the group consisting of liquid, liquid concentrate, gel, powder, tablet, granule and mixtures thereof; (b) optionally a source of water or deionized water; and (c) optionally a set of instructions in association with said spray dispenser comprising an instruction to dispense said coating composition from said spray dispenser onto said hard surface.

In another embodiment of the present invention there is provided a treated hard surface coated with the coating composition. Substrates treated with the benefit agent materials of the present invention exhibit a greater improvement in wetting and sheeting, quick drying, uniform drying, soil removal, self-cleaning, anti-spotting, anti-soil deposition, cleaner appearance, enhanced gloss, enhanced color, minor surface defect repair, improved smoothness, anti-hazing properties, modification of surface friction, release of actives, reduced damage to abrasion and improved transparency than substrates treated without such benefit agent materials.

In another embodiment of the invention there is provided a treated hard surface coated with a coating composition, where the coating composition is strippable. Substrates treated with the benefit agent materials of the present invention exhibit a greater improvement in soil removal, self-cleaning, anti-spotting, anti-soil deposition, cleaner appearance after at least one effective nanoparticle layer has been stripped than substrates treated without such benefit agent materials.

These and other objects, features and advantages will be clear from the following detailed description, examples and appended claims.

All percentages, ratios and proportions herein are on a weight basis based on a neat product unless otherwise indicated. All documents cited herein are hereby incorporated by reference.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in conjunction with the accompanying drawings, in which:

DETAILED DESCRIPTION OF THE INVENTION

Inanimate Hard Surfaces

Figure 1:
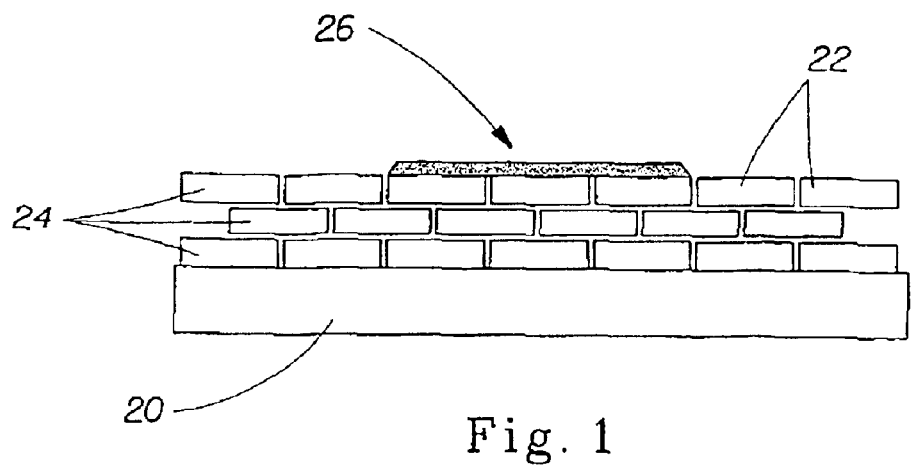
FIG. 1 is a schematic side view of a hard surface with several layers of nanoparticles that form a coating thereon, and soil on a portion of the nanoparticle coating.

Fiberglass surfaces comprise resins, polymers, reinforcing fabric and fibers. Hard surfaces made from fiberglass include but are not limited to bathtubs, boats, motorcycles, car bodies, canoes, airplanes, model aircraft, jet skis, sculptures, as well as traditional industrial molding and model-making articles.

There are seven basic types of hard surface plastics which include polyethylene terephthalate (PET), high density polyethylene (HDPE), polyvinyl chloride (PVC), low density polyethylene (LDPE), polypropylene (PP), polystyrene (PS), polymers and mixtures thereof. Manufacturers are unlimited in the number and types of articles that can be made from plastic. Carbon and graphite fibers are high-strength materials that are used as reinforcing agents in plastic composites. Examples of plastic articles include bottles, jars, jugs, bags, covers, pipes, furniture, containers, caps, cups, trays, aircraft fuselages and wings, spacecraft structures, and sports equipment.

Both ferrous and nonferrous metal surfaces are available for use with this invention. These include aluminum, brass, bronze, chrome, copper, tin, zinc, iron, stainless steel and steel. Examples of metal surfaces include (e.g. buildings, doors, window frames, automobiles, boats, structures, and many more too numerous to mention).

There are three basic types of glass-sheet, plate, and float. These basic glass types can be changed to meet modern requirements for comfort, security, safety, and architectural needs by adding chemicals or other ingredients during fabrication and processing.

There are a number of distinct dishware surface types available. Dishware can include glassware, ceramic ware, plastic ware, wood ware and metal ware. Examples of dishware include agateware, basalt, bisque, bone china, cauliflower ware, cream ware, delft, earthenware, flambe, hard paste porcelain, ironstone, jackfield, jasper, lusterware, majolica, marbled, parian, pate-sur-pate, pearl ware, porcelain, redware, salt glaze, slipware, snowman-porcelain, soft paste porcelain, spatter ware, staffordshire figures, stoneware, tortoiseshell, and transfer ware. Utensils can also be made from any of the above materials.

Ceramic surfaces include glazed tile, mosaic tile, and quarry tile. Applications of ceramic tiles include countertops, walls, floors, ceilings and appliances.

Other types of surfaces, such as sinks, bath tubs, and toilets may be made of porcelain, ceramic, or other materials.

There are many types of wood surfaces available. Examples of some types of wood include wood surface is selected from the group consisting of alder, ash, aspen, beech, birch, bocote, bubinga, butternut, cedar, cherry, cocobolo, canarywood, cypress, ebony, hickory, holly, kingwood, lacewood, locust, mahogany, maple, oak, osage, parawood, padauk, pecan, persimmon, poplar, purpleheart, redheart, rosewood, spanish cedar, sycamore, teak, tulipwood, walnut, wenge, zebrawood, ziricote. Articles made from wood can include furniture, baseball bats, chairs, stools, furniture, handles, motor-vehicle parts, barrels and crates, sporting and athletic goods, railroad ties, veneer, flooring, treated lumber, such as that used for decks, siding, crates, and interior finishing.

There are three basic types of stone surfaces available—igneous, metamorphic and sedimentary. Some of these surfaces include granite, marble, slate, sandstone, serpentinite, schistose gneiss, quartzite, sandstone, limestone and fieldstone. Stone is often used in construction of buildings, roads, walls, fireplaces and monuments. There are a number of types of concrete surfaces available as well. These surfaces include unreinforced concrete, reinforced concrete, cast-in-place concrete, precast concrete, post-tensioned concrete, and prestressed concrete. Examples of concrete surfaces include building components, bridge components, walls, streets, curbs and gutters. Asphalt comes in four types—hot-mix asphalt, cold-mix asphalt, glassphalt and rubberized asphalt. Asphalt is used on road surfaces, walls, roofing and sporting tracks. There are a multitude of mineral surfaces available. Minerals comprise ores of metal and other natural substances that can be mined. Examples of mineral surfaces may include jewelry, furniture, building components and many more. Finally coated and painted surfaces are also examples of hard surfaces that can be modified by the present invention to derive the desired benefits.

Nanoparticle System

The nanoparticle system can comprise materials, compositions, devices, appliances, procedures, methods, conditions, etc. serving a common purpose of modification of hard surfaces to bring about the desired multi-use benefits of improved wetting and sheeting, quick drying, uniform drying, soil removal, self-cleaning, anti-spotting, anti-soil deposition, cleaner appearance, enhanced gloss, enhanced color, minor surface defect repair, improved smoothness, anti-hazing properties, modification of surface friction, release of actives, reduced damage to abrasion and improved transparency.

Nanoparticles, defined as particles with diameters of about 400 nm or less, are technologically significant, since they are utilized to fabricate structures, coatings, and devices that have novel and useful properties due to the very small dimensions of their particulate constituents. Nanoparticles with particle sizes ranging from about 2 nm to about 400 nm can be economically produced. Particle size distributions of the nanoparticles in the present invention may fall anywhere within the range from about 1 nm, or less, to less than about 400 nm, alternatively from about 2 nm to less than about 100 nm, and alternatively from about 2 nm to less than about 50 nm. For example, a layer synthetic silicate can have a mean particle size of about 25 nanometers while its particle size distribution can generally vary between about 10 nm to about 40 nm. Alternatively, nanoparticles can also include crystalline or amorphous particles with a particle size from about 1, or less, to about 100 nanometers, alternatively from about 2 to about 50 nanometers. Nanotubes can include structures up to 1 centimeter long, alternatively with a particle size from about 1, or less, to about 50 nanometers.

The coating composition comprises nanoparticles; optionally a surfactant; optionally having associated to said nanoparticle surface a quantity of one or more functionalized surface molecules exhibiting properties selected from the group consisting of hydrophilic, hydrophobic and mixtures thereof; optionally one or more adjunct ingredients; and a suitable carrier medium to form a transparent coating on a hard surface.

Inorganic nanoparticles generally exist as oxides, silicates, carbonates and hydroxides. Some layered clay minerals and inorganic metal oxides can be examples of nanoparticles. The layered clay minerals suitable for use in the present invention include those in the geological classes of the smectites, the kaolins, the illites, the chlorites, the attapulgites and the mixed layer clays. Typical examples of specific clays belonging to these classes are the smectites, kaolins, illites, chlorites, attapulgites and mixed layer clays. Smectites, for example, include montmorillonite, bentonite, pyrophyllite, hectorite, saponite, sauconite, nontronite, talc, beidellite, volchonskoite and vermiculite. Kaolins include kaolinite, dickite, nacrite, antigorite, anauxite, halloysite, indellite and chrysotile. Illites include bravaisite, muscovite, paragonite, phlogopite and biotite. Chlorites include corrensite, penninite, donbassite, sudoite, pennine and clinochlore. Attapulgites include sepiolite and polygorskyte. Mixed layer clays include allevardite and vermiculitebiotite. Variants and isomorphic substitutions of these layered clay minerals offer unique applications.

The layered clay minerals of the present invention may be either naturally occurring or synthetic. An example of one embodiment of the present invention uses natural or synthetic hectorites, montmorillonites and bentonites. Another embodiment uses the hectorites clays commercially available, and typical sources of commercial hectorites are the Laponites from Southern Clay Products, Inc., U.S.A; Veegum Pro and Veegum F from R. T. Vanderbilt, U.S.A.; and the Barasyms, Macaloids and Propaloids from Baroid Division, National Read Comp., U.S.A.

The inorganic metal oxides of the present invention may be silica- or alumina-based nanoparticles that are naturally occurring or synthetic. Aluminum can be found in many naturally occurring sources, such as kaolinite and bauxite. The naturally occurring sources of alumina are processed by the Hall process or the Bayer process to yield the desired alumina type required. Various forms of alumina are commercially available in the form of Gibbsite, Diaspore, and Boehmite from manufactures such as Condea.

Natural Clays—Natural clay minerals typically exist as layered silicate minerals and less frequently as amorphous minerals. A layered silicate mineral has $SiO_4$ tetrahedral sheets arranged into a two-dimensional network structure. A 2:1 type layered silicate mineral has a laminated structure of several to several tens of silicate sheets having a three layered structure in which a magnesium octahedral sheet or an aluminum octahedral sheet is sandwiched between two sheets of silica tetrahedral sheets.

A sheet of an expandable layer silicate has a negative electric charge, and the electric charge is neutralized by the existence of alkali metal cations and/or alkaline earth metal cations. Smectite or expandable mica can be dispersed in water to form a sol with thixotropic properties. Further, a complex variant of the smectite type clay can be formed by the reaction with various cationic organic or inorganic compounds. As an example of such an organic complex, an organophilic clay in which a dimethyldioctadecyl ammonium ion(a quaternary ammonium ion) is introduced by cation exchange and has been industrially produced and used as a gellant of a coating.

Synthetic Clays—With appropriate process control, the processes for the production of synthetic nanoscale powders (i.e. synthetic clays) does indeed yield primary particles, which are nanoscale. However, the particles are not usually present in the form of discrete particles, but instead predominantly assume the form of agglomerates due to consolidation of the primary particles. Such agglomerates may reach diameters of several thousand nanometers, such that the desired characteristics associated with the nanoscale nature of the particles cannot be achieved. The particles may be deagglomerated, for example, by grinding as described in EP-A 637,616 or by dispersion in a suitable carrier medium, such as water or water/alcohol and mixtures thereof.

The production of nanoscale powders such as layered hydrous silicate, layered hydrous aluminum silicate, fluorosilicate, mica-montmorillonite, hydrotalcite, lithium magnesium silicate and lithium magnesium fluorosilicate are common. An example of a substituted variant of lithium magnesium silicate is where the hydroxyl group is partially substituted with fluorine. Lithium and magnesium may also be partially substituted by aluminum. In fact, the lithium magnesium silicate may be isomorphically substituted by any member selected from the group consisting of magnesium, aluminum, lithium, iron, chromium, zinc and mixtures thereof.

Synthetic hectorite was first synthesized in the early 1960's and is now commercially marketed under the trade name Laponite™ by Southern Clay Products, Inc. There are many grades or variants and isomorphous substitutions of Laponite™ marketed. Examples of commercial hectorites are Lucentite SWN™, Laponite S™, Laponite XLS™, Laponite RD™ and Laponite RDS™. One embodiment of this invention uses Laponite XLS™ having the following characteristics: analysis (dry basis) $SiO_2$ 59.8%, MgO 27.2%, $Na_2O$ 4.4%, $Li_2O$ 0.8%, structural $H_2O$ 7.8%, with the addition of tetrasodium pyrophosphate (6%); specific gravity 2.53; bulk density 1.0.

Synthetic hectorites, such as Laponite RD™, do not contain any fluorine. An isomorphous substitution of the hydroxyl group with fluorine will produce synthetic clays referred to as sodium magnesium lithium fluorosilicates. These sodium magnesium lithium fluorosilicates, marketed as Laponite™ and Laponite S™, contain fluoride ions of approximately 5% by weight. Laponite B™ has a mean particle size of about 25 nanometers in length and about 1 nanometer in thickness. Another variant, called Laponite S™, contains about 6% of tetrasodium polyphosphate as an additive.

Laponite™ has the formula:

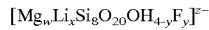

$$[Mg_wLi_xSi_8O_{20}OH_{4-y}F_y]^{z-}$$

wherein w=3 to 6, x=0 to 3, y=0 to 4, z=12−2w−x, and the overall negative lattice charge is balanced by counter-ions; and wherein the counter-ions are selected from the group consisting of selected $Na^+$, $K^+$, $NH_4^+$, $Cs^+$, $Li^+$, $Mg^{++}$, $Ca^{++}$, $Ba^{++}$, $N(CH_3)_4^+$ and mixtures thereof.

Depending upon the application, the use of variants and isomorphous substitutions of Laponite™ provides great flexibility in engineering the desired properties of the coating composition of the present invention. The individual platelets of Laponite™ are negatively charged on their faces and possess a high concentration of surface bound water. When applied to a hard surface, the hard surface is hydrophilically modified and exhibits surprising and significantly improved wetting and sheeting, quick drying, uniform drying, anti-spotting, anti-soil deposition, cleaner appearance, enhanced gloss, enhanced color, minor surface defect repair, improved smoothness, anti-hazing properties, modification of surface friction, release of actives, reduced damage to abrasion and improved transparency properties. In addition, the Laponite™ modified surface exhibits short lived "self-cleaning" properties (dirt removal via water rinsing, e.g. from rainwater) and/or soil release benefits (top layers are strippable via mild mechanical action).

In contrast to hydrophilic modification with organic polymers, benefits provided by Laponite™, either alone or in combination with a charged modifier, are longer lived. For example, sheeting/anti-spotting benefits are maintained on an automobile body and glass window after multiple rinses versus one rinse with tap water or rainwater versus on a surface coated with current hydrophilic polymer technology.

Inorganic Metal Oxides—Inorganic metal oxides generally fall within two groups—photoactive and non-photoactive nanoparticles. General examples of photoactive metal oxide nanoparticles include zinc oxide and titanium oxide. Photoactive metal oxide nanoparticles require photoactivation from either visible light (e.g. zinc oxide) or from UV light ($TiO_2$). Zinc oxide coatings have generally been used as anti-microbial agents or as anti-fouling agents.

Titanium dioxide is taken to be rutiles, anatases and amorphous titanium dioxide having a particle size of 1 to 100 nm, alternatively of 1 to 10 nm, or titanium dioxide having the above-stated particle size in dispersed form. A range of interesting industrial applications for such titanium dioxide particles is beginning to emerge: as a photoactive UV screening agent in cosmetics, plastics, silicone resins and lacquers, wherein the transparency due to the small particle size is a particularly desirable characteristic of the particles; as a flame retardant and to increase the refractive index of silicones and plastics, as described in FR 2 682 369; in protection to degrade organic pollutants, including halogenated pollutants, in waste waters by photocatalysis; to accelerate the decomposition of (bio)degradable polymers; as a support material for novel dye solar cells, as are described, for example, in PCT-WO 93/20569; together with $SiO_2$ produced using the same method, as a component in special glasses (JP. Pat. No. 10,297,436 A2).

Non-photoactive metal oxide nanoparticles do not use UV or visible light to produce the desired effects. Examples of non-photoactive metal oxide nanoparticles include silica and alumina.

It is possible using the sol/gel process, starting from metal alkoxides, to produce particles having an average diameter of below 50 nm by a controlled increase in molecular weight. Such systems are used, for example, as coating compositions or active substance precursors as described, e.g., in The Polymeric Materials Encyclopedia 1996, volume 6, 4782–4792 et seq.).

Nanoscale metal oxide sols are usually 10 to 50% colloidal solutions of metal oxides (Si, Al, Ti, Zr, Ta, Sn, Zn) having average particle sizes of 2 to about 50 nm in aqueous or organic media. Organophilic particles of a metal oxide chosen from alumina ($Al_2O_3$), silica ($SiO_3$), titanium ($TiO_2$) in which process an aqueous-alcoholic suspension of metal oxide particles have no pores less than 5 nm in diameter at their surface. It is possible to prevent such metal oxide sols from agglomerating by electric and/or steric stabilization of the particle surfaces. Aqueous silica sols may in particular be mentioned, which may be produced, for example, from alkaline solutions by ion exchange processes (for example Ullmann's Encyclopedia of Industrial Chemistry, $5^{th}$ edition, volume A23, VCH-Verlag, Weinheim, 1993, pp. 614–629). Such products are commercially available, for example under trade names such as Levasil (Bayer AG).

Boehmite alumina is a water dispersible, inorganic metal oxide having a mean particle size of about 25 nanometers in length and about 2–4 nanometers in thickness. Such product is commercially available, for example, under the trade name Disperal P2™.

Prior art disclosures have shown it is possible to coat cellulosic materials with colloidal silica sols. In the past, generally dilute aqueous solutions of colloidal silica and urea for non-skid surface compositions for paper products, especially paperboard containing recycled paper fibers, are disclosed in U.S. Pat. Nos. 4,418,111 and 4,452,723 Carstens (assigned to Key Tech Corporation). The use of colloidal silica sols to coat paper in order to provide slip resistance is disclosed in U.S. Pat. Nos. 2,643,048 and 2,872,094.

Inorganic metal oxide nanoparticle provide an additional benefit above those of the layered clays where concentrated sols of inorganic metal oxides can be prepared without gelling. This is particularly advantageous for applications that utilize a dilution step prior to application of the coating composition. Additionally, inorganic metal oxide nanoparticles can provide tolerance to hard water used in making nanoparticle dispersions, diluting nanoparticles dispersion compositions, and the application of nanoparticle compositions wherein the surface contains hard water ions.

Colloidal silica sols have also been employed to impart stiffness to paper and generally for the treatment of paper as disclosed in U.S. Pat. Nos. 2,883,661; 2,801,938; 2,980,558 and other patents.

Charged Functionalized Molecules

In the present invention, one or more charged functionalized surface molecules may comprise at least two different types of functionalized surface molecules. Furthermore, charged functionalized surface molecules are selected from the group consisting of polymers, copolymers, surfactants and mixtures thereof. Functionalized surface molecules can also be selected from the group consisting of multi-valent inorganic salts consisting of $Ca^{+2}$, $Mg^{+2}$, $Ba^{+2}$, $Al^{+3}$, $Fe^{+2}$, $Fe^{+3}$, $Cu^{+2}$ and mixtures thereof, where an appropriate anion is used to balance the charge.

In application, hydrophilic modification can be augmented via use of Laponite™ as a basecoat or primer and then treating the negatively charged surface with functionalized charged molecules as a two-step process. Specifically, sequential layering of Laponite™ and ethoxylated, quaternized oligoamines results in a reduction in the contact angles, and enhanced sheeting/wetting of the treated surface. Moreover, if the charged functionalized molecule species possess a lipophilic component, the Laponite treated surface can be hydrophobically modified. Net, the combination of nanoclay plus charge functionalized molecules provides a novel technique for tailoring the hydrophilic/lipophilic character of a hard surface.

Similarly, hydrophilic modification can be augmented via use of alumina as a basecoat or primer and then treating the positively charged surface with functionalized charged molecules as a two-step process. Specifically, sequential layering of alumina and hydrophilic anionic polymers results in enhanced sheeting/wetting of the treated surface. Moreover, if the charged functionalized molecule species possess a lipophilic component, the alumina treated surface can be hydrophobically modified. Net, the combination of inorganic metal oxides plus charge functionalized molecules provides a novel technique for tailoring the hydrophilic/lipophilic character of a hard surface.

I. Composition

If the coating is in the form of a composition, the coating composition may be in any form, such as liquids (aqueous or non-aqueous), granules, pastes, powders, spray, foam, tablets, gels, and the like. Granular compositions can be in "compact" form and the liquid compositions can also be in a "concentrated" form. The coating compositions of the present invention encompass compositions that are used on any suitable hard surface including, but not limited to: fiberglass, plastics, metals, glass, ceramic, wood, stone, concrete, asphalt, mineral, coated surfaces, painted surfaces and mixtures thereof.

In one embodiment, the hard surface coating composition comprises: (a) an effective amount of non-photoactive nanoparticles; (b) optionally one or more adjunct ingredients; and (c) optionally a suitable carrier medium.

In another embodiment, the hard surface coating composition comprises: (a) an effective amount of non-photoactive nanoparticles; (b) a surfactant; (c) optionally one or more adjunct ingredients; and (d) a suitable carrier medium.

In another embodiment, the hard surface coating composition comprises: (a) an effective amount of non-photoactive nanoparticles; (b) a surfactant; (c) having associated to said nanoparticle surface a quantity of one or more functionalized surface molecules exhibiting properties selected from the group consisting of hydrophilic, hydrophobic and mixtures thereof; (d) optionally one or more adjunct ingredients; and (e) a suitable carrier medium.

In another embodiment, the hard surface coating composition comprises: (a) an effective amount of non-photoactive nanoparticles; (b) a surfactant; (c) having associated to said nanoparticle surface a quantity of one or more functionalized surface molecules exhibiting properties selected from the group consisting of hydrophilic, hydrophobic and mixtures thereof; (d) an effective amount of photoactive nanoparticles; (e) optionally one or more adjunct ingredients; and (f) a suitable carrier medium.

Alternatively an effective amount of one or more nanoparticles described above are included in compositions useful for coating a variety of hard surfaces in need of treatment. As used herein, "effective amount of one or more nanoparticles" refers to the quantity of nanoparticles of the present invention described hereinbefore necessary to impart the desired hard surface coating benefit in the specific composition. Such effective amounts are readily ascertained by one of ordinary skill in the art and is based on many factors, such as the particular nanoparticle used, the hard surface coating application, the specific composition of the hard surface coating composition, and whether a liquid or dry (e.g., granular, powder) composition is required, and the like.

An effective amount of a non-photoactive nanoparticle in the present invention, such as a natural clay, synthetic clay or an inorganic metal oxide, requires that at least 10% of the target surface is modified to effect the desired benefits.

The concentration of nanoparticles in the material or the compositions described herein can range all the way up to 100%. A non-limiting example of the use of nanoparticles in such a high concentration would be if the nanoparticles alone were applied in the form of a powder to the surface to be treated.

In one non-limiting aspect of the present invention, the concentration of nanoparticles in the coating composition prior to application to a hard surface is less than or equal to about 50% by weight of the coating composition, or any number less than 50% of the weight of the coating composition (e.g., less than or equal to about 20%, for example when the coating composition is a liquid that is to be sprayed onto the hard surface; alternatively, less than or equal to about 0.5%, alternatively less than or equal to about 0.1%).

In one aspect of the present invention, the coating composition is prepared by dispersing the dry nanoparticle powder into deionized water to form a 1% concentrated mixture. This mixture is then applied to said surface by either spraying, dipping, painting, wiping, or other manner in order to deliver a coating, especially a transparent coating that covers at least 10% and/or alternatively at least 30% and/or alternatively at least 50% and/or alternatively at least 80% and/or alternatively at least 100% of said surface.

In another embodiment of the present invention, the coating composition is prepared by diluting a nanoparticle gel with deionized water to form a 1% concentrated mixture. This mixture is then applied to said surface by either spraying, dipping, painting, wiping, or other manner in order to deliver a transparent coating that covers at least 10% and/or alternatively at least 30% and/or alternatively at least 50% and/or alternatively at least 80% and/or alternatively at least 100% of said surface.

In another embodiment of the present invention, the coating composition is prepared by diluting a 10% concentrated boehmite alumina (e.g. Disperal P2TM from Condea, Inc.) coating composition with deionized water to form a 0.1% concentrated mixture. This mixture is then applied to said surface by either spraying, dipping, painting, wiping, or other manner in order to deliver a coating especially a transparent coating that covers at least 10% and/or alternatively at least 30% and/or alternatively at least 50% and/or alternatively at least 80% and/or alternatively at least 100% of said surface.

In another embodiment of the present invention, the coating composition is prepared by diluting a 1% concentrated sodium magnesium lithium fluorosilicate (e.g. Laponite B™ from Southern Clay Products, Inc.) coating composition with deionized water to form a 0.1% concentrated mixture. This mixture is then applied to said surface by either spraying, dipping, painting, wiping, or other manner in order to deliver a coating especially a transparent coating that covers at least 10% and/or alternatively at least 30% and/or alternatively at least 50% and/or alternatively at least 80% and/or alternatively at least 100% of said surface.

In another embodiment of the present invention, the coating composition is prepared by diluting a 1% concentrated lithium magnesium sodium silicate (e.g. Lucentite SWN™ from Kobo Products, Inc.) coating composition with deionized water to form a 0.1% concentrated mixture. This mixture is then applied to said surface by either spraying, dipping, painting, wiping, or other manner in order to deliver a coating especially a transparent coating that covers at least 10% and/or alternatively at least 30% and/or alternatively at least 50% and/or alternatively at least 80% and/or alternatively at least 100% of said surface.

In another embodiment of the present invention, the coating composition is prepared by dispersing the dry nanoparticle powder into deionized water to form a 0.1% concentrated mixture. This mixture is then applied to said surface by either spraying, dipping, painting, wiping, or other manner in order to deliver a coating especially a transparent coating that covers at least 10% and/or alternatively at least 30% and/or alternatively at least 50% and/or alternatively at least 80% and/or alternatively at least 100% of said surface.

In other embodiments, the coating composition is prepared by dispersing the dry nanoparticle powder with a surfactant and a dispersant into tap water, so that the use of deionized water is not necessary. Two non-limiting examples of such a coating composition are provided in the Examples section at the end of this description. Examples of other suitable dispersants include, but are not limited to: poly (acrylic/allyl alcohol), poly (acrylic/maleic), poly (a-hydroxyacrylic acid), poly (tetramathylene-1,2-dicarbocylic acid), poly (4-methocy-tetramethylene-1,2-dicarbocylic acid)-sodium tripolyphosphate, pyrophosphate, and the other dispersants and builders described herein. This mixture is then applied to said surface by either spraying, dipping, painting, wiping, or other manner in order to deliver a coating especially a transparent coating that covers at least 10% and/or alternatively at least 30% and/or alternatively at least 50% and/or alternatively at least 80% and/or alternatively at least 100% of said surface.

In one non-limiting aspect, an effective amount of charged functionalized surface molecules that provide hydrophobic properties to the nanoparticle surface, generally modifies from about 1% to about 100% of the nanoparticle surface or from about 0.01 to about 5% by weight of the coating composition.

In other embodiments, rather than modifying the characteristic of the surface to be coated, the charged functionalized molecules can be used to aid in the delivery of the nanoparticles to the surface to be coated. For instance, in one non-limiting embodiment, a surfactant could be mixed with the nanoparticles in order to aid in the delivery of the nanoparticles to the surface to be coated in cases in which it is difficult to combine the nanoparticle coating with another carrier medium, or in which it is difficult to apply the nanoparticles to a particular surface. For example, if the nanoparticles are to be used with an organic clearcoat composition, it may be difficult to suspend the nanoparticles in the clearcoat composition, or to spread the nanoparticle coating on the surface of such a clearcoat composition. In such a case, the addition of a relatively small amount of surfactant (e.g., virtually any amount of surfactant or functionalized molecules, for example a stoichiometric amount) to the nanoparticles, will aid in overcoming these difficulties. In such a case, the amount of charged functionalized molecules can be less than about 0.01% of the coating composition.

Several non-limiting examples of various coatings and coating compositions wherein the nanoparticles of the present invention may be employed are discussed in further detail below. Also, the coating compositions may include from about 0.001% to about 99.999%, alternatively from about 0.01% to about 99.99% by weight of the coating composition of the adjunct materials.

As used herein, the coatings and "coating compositions" include hand and machine applied coatings, compositions, including additive coatings, additive compositions, and compositions suitable for use in the soaking and/or pretreatment of unclean or stained hard surfaces. The coatings, coating compositions and/or methods and/or articles of manufacture of the present invention are for all uses including manufacturing, commercial, industrial, institutional, agricultural and/or for domestic use.

When the coating compositions are formulated as compositions suitable for use in an enumerated method or article of manufacture, the coating compositions of the present invention alternatively contain both an effective amount of nanoparticles and a suitable carrier medium to form the nanoparticle system and may optionally include one or more of the following: a surfactant, a quantity of one or more charged functionalized surface molecules, photoactive nanoparticles, and one or more adjunct ingredients.

The coating compositions of the present invention can also be used as detergent additive products in solid or liquid form. Such additive products are intended to supplement or boost the performance of conventional coating compositions used to clean hard surfaces and can be added at any stage of the cleaning process, however addition of the transparent hard surface coating composition to a clean surface is more effective.

Aqueous liquid, coating compositions according to the present invention can also be in a "concentrated form", in such case, the concentrated liquid, coating compositions according the present invention will contain a lower amount of a suitable carrier medium, compared to conventional liquid, coating compositions. Typically the suitable carrier medium content of the concentrated system, hard surface coating composition is alternatively 99.99 to 50% by weight of the coating composition.

Aqueous liquid, coating compositions according to the present invention can also be in a "concentrated form" that is compatible with "tap water", in such case, the concentrated liquid, coating compositions according the present invention will contain a lower amount of a suitable carrier medium, compared to conventional liquid, coating compositions and a dispersant. Typically the suitable carrier medium content of the concentrated system, hard surface coating composition is alternatively 99.99 to 50% by weight of the coating composition. Typically the dispersant content of the concentrated system, hard surface coating composition is alternatively 0.001 to 10%.

The present invention comprises liquid (a compatible carrier), coating compositions, alternatively aqueous liquid (a compatible carrier), coating compositions. Aqueous liquid, coating compositions alternatively comprise in addition to the nanoparticle system described hereinabove, about 50% to about 99.99%, alternatively from about 80% to about 99.99%, by weight of liquid carrier or suitable carrier medium, such as an alcohol and/or water.

The aqueous liquid, coating compositions of the present invention also alternatively comprise one or more adjunct materials. The term "adjunct materials", as used herein, means any liquid, solid or gaseous material selected for aqueous liquid, coating compositions, alternatively compatible with the other ingredients present in the aqueous liquid, coating compositions of the present invention.

The specific selection of adjunct materials is readily made by considering the surface or to be cleaned. Examples of suitable adjunct materials include, but are not limited to, surfactants, builders, bleaches, bleach activators, bleach catalysts, enzymes, enzyme stabilizing systems, chelants, optical brighteners, soil release polymers, dye transfer agents, dispersants, suds suppressors, dyes, perfumes, colorants, filler salts, hydrotropes, photoactivators, fluorescers, conditioners, hardening agents, hydrolyzable surfactants, preservatives, anti-oxidants, anti-wrinkle agents, germicides, fungicides, color speckles, silvercare, anti-tarnish and/or anti-corrosion agents, alkalinity sources, solubilizing agents, carriers, processing aids, pigments and pH control agents as described in U.S. Pat. Nos. 5,705,464; 5,710,115; 5,698,504; 5,695,679; 5,686,014 and 5,646,101. Specific adjunct materials are exemplified in detail hereinafter.

If the adjunct materials are not compatible with the other ingredients present in the aqueous liquid, coating compositions of the present invention, then suitable methods of keeping the incompatible adjunct materials and the other ingredients separate (not in contact with each other) until combination of the two components is appropriate can be used. Suitable methods can be any method known in the art, such as gelcaps, encapsulation, tablets, physical separation, etc.

The coating compositions of the present invention can comprise: (a) an effective amount of non-photoactive nanoparticles; (b) optionally a surfactant; (c) optionally having associated to said nanoparticle surface a quantity of one or more functionalized surface molecules exhibiting properties selected from the group consisting of hydrophilic, hydrophobic and mixtures thereof; (d) optionally an effective amount of photoactive nanoparticles; (e) optionally one or more adjunct ingredients; and (f) a suitable carrier medium.

The coating compositions of the present invention can also be used as detergent additive products in liquid form for automatic dishwashing machines. Such additive products are intended to supplement or boost the performance of conventional coating compositions and can be added at any stage of the dishwashing process, however, best results are achieved in the rinsing cycle.

Further, the coating compositions according to the present invention may be isotropic liquids, aqueous gels, phase-separated liquid compositions and/or colored liquid compositions.

The coating compositions according to the present invention may be of any suitable viscosity. The viscosity of the coating compositions should be such that they are able to be effectively applied to the surface to be coated. Thus, for instance, if the coating compositions are to be applied to a hard surface that has portions that are sloped (their slope has a vertical component), the hard surface coating composition should not have such a low viscosity that the coating composition runs off the surface to be coated. Non-limiting examples of suitable viscosities are less than or equal to about 1,000 Cps at 100 rpm, or any increment of 10 less than 1,000 (including, but not limited to 100 Cps, 40 Cps, and 1 Cps (the latter being the viscosity of water)). The method for determining the viscosity of the coating compositions is set forth in the Test Methods section.

The dry coating compositions of the present invention can comprise: (a) an effective amount of non-photoactive nanoparticles; (b) optionally a surfactant; (c) optionally having associated to said nanoparticle surface a quantity of one or more functionalized surface molecules exhibiting properties selected from the group consisting of hydrophilic, hydrophobic and mixtures thereof; (d) optionally one or more adjunct ingredients; and (e) an optionally, a suitable carrier medium.

The dry coating compositions of the present invention can also be used as detergent additive products in powder, granule or tablet form for automatic dishwashing machines. Such additive products are intended to supplement or boost the performance of conventional coating compositions and can be added at any stage of the dishwashing process, however, best results are achieved in the rinsing cycle.

Further, the dry coating compositions according to the present invention may be in powder, granule, tablet or encapsulated complex form.

Suitable Carrier Medium

Suitable carrier mediums include liquids, solids and gases. One suitable carrier medium is water, which can be distilled, deionized, or tap water. Water is valuable due to its low cost, availability, safety, and compatibility. Though aqueous carrier mediums are more common than dry, non-aqueous mediums, the present invention can exist as a dry powder, granule or tablet or encapsulated complex form.

Optionally, in addition to water, the carrier can contain a low molecular weight organic solvent that is highly soluble in water, e.g., ethanol, methanol, propanol, isopropanol and the like, and mixtures thereof. Low molecular weight alcohols can allow the treated hard surface to dry faster. The optional water soluble low molecular weight solvent can be used at a level of up to about 50%, typically from about 0.1% to about 25%, alternatively from about 2% to about 15%, alternatively from about 5% to about 10%, by weight of the suitable carrier medium. Factors that need to consider when a high level of solvent is combined with the suitable carrier medium are odor, flammability, dispersancy of the nanoparticle and environment impact.

In one non-limiting embodiment, the carrier can comprise any known clearcoat composition. U.S. Pat. No. 5,853,809 describes one non-limiting example of a clearcoat composition.

In other embodiments, the carrier can be an airstream. For instance, the material, or the composition can be added into a stream of moving air, and the air can convey the non-photoactive nanoparticles to the surface to be treated.

In other embodiments, the coating material or composition can simply be dropped through the air by gravity onto the surface to be treated (one example of which would be by sifting a solid material onto the surface).

Classes of Functionalized Surface Molecules

Polymer Classes and Examples

Polymers and copolymers in which at least one segment or group of the polymer comprises functionality that serves to anchor or enhance adsorption on nanoparticle surfaces. These polymers also comprise at least one segment or group that serves to provide either hydrophilic or hydrophobic character to the polymer when adsorbed on a nanoparticle. Note that in some cases, the anchoring segment may also serve as the hydrophilizing segment.

Examples of the anchoring segments or groups include: polyamines, quaternized polyamines, amino groups, quaternized amino groups, and corresponding amine oxides; zwitterionic polymers; polycarboxylates; polyethers; polyhydroxylated polymers; polyphosphonates and polyphosphates; and polymeric chelants.

Examples of the hydrophilizing segments or groups include: water soluble polyethers; water soluble polyhydroxylated groups or polymers, including saccharides and polysaccharides; water soluble carboxylates and polycarboxylates; water soluble anionic groups such as carboxylates, sulfonates, sulfates, phosphates, phosphonates and polymers thereof; water soluble amines, quaternaries, amine oxides and polymers thereof; water soluble zwitterionic groups and polymers thereof; water soluble amides and polyamides; and water soluble polymers and copolymers of vinylimidazole and vinylpyrrolidone.

Examples of the hydrophobizing segments or groups include: alkyl, alkylene, and aryl groups, and polymeric aliphatic or aromatic hydrocarbons; fluorocarbons and polymers comprising fluorocarbons; silicones; hydrophobic polyethers such as poly(styrene oxide), poly(propylene oxide), poly(butene oxide), poly(tetramethylene oxide), and poly(dodecyl glycidyl ether); and hydrophobic polyesters such as polycaprolactone and poly(3-hydroxycarboxylic acids).

Hydrophilic Surface Polymers

Ethoxylated or alkoxylated polyamines including: hexamethylenediamine, ethoxylated to a degree of 3–100 on each NH site; bis(hexamethylenetriamine), ethoxylated to a degree of 3–100 on each NH site; tetraethylenepentamine, ethoxylated to a degree of 3–100 on each NH site; polyethyleneimine of MW 300–25,000 ethoxylated to a degree of 3–100 per NH or alkoxylated with propylene or butylene oxide and ethoxylated sufficiently to confer hydrophilicity; polyvinylamine of MW 200–25,000, ethoxylated to a degree of 2–100 per NH; polyallylamine of MW 200–25,000, ethoxylated to a degree of 2–100 per NH; quaternized analogs of the above with at least one nitrogen quaternized by an alkylating agent such as methyl chloride, dimethyl sulfate, benzyl chloride, and ethylene or propylene oxide and mixtures thereof. In addition, quaternization may be with hydrophobic materials such as dodecyl bromide with the provision that the level of hydrophobic group so introduced is not sufficient to make the nanoparticle surface on which the polymer is adsorbed hydrophobic; sulfated, carboxylated, or phosphated analogs of the above with at least one of the terminal OH groups derivatized to introduce the anionic functionality; amine oxide analogs of the ethoxylated or alkoxylated polyamines in which at least one amine group is oxidized to the amine oxide; betaine and sulfobetaine analogs of the ethoxylated or alkoxylated polyamines in which at least one amine group is quaternized by an agent such as chloroacetate propanesultone, or allyl chloride which is subsequently sulfonated; and combinations of the above.

Polycarboxylated polyamines include: reaction products of polyethyleneimine with maleic acid, fumaric acid or chloroacetate. These may also comprise ethoxylated segments. See U.S. Pat. No. 5,747,440 which is incorporated by reference.

Polycarboxylates include: polyacrylic and polymethacrylic acid and copolymers with maleic acid; polymaleic acid and copolymers comprising maleic acid, fumaric acid, or maleic anhydride with another monomer such as methyl vinyl ether or a lower alkene; and graft copolymers of the above polycarboxylates which further comprise ethoxyated segments such as derived from the monomethyl ether of polyethylene glycol. The above polycarboxylate polymers may also comprise hydrophobic groups such as esters of butanol or 2-ethylhexanol, provided that their level is not sufficient to render the nanoparticle surface on which the polymer is adsorbed hydrophobic.

Polyethers include: block copolymers of ethylene oxide with propylene oxide, butylene oxide, tetramethylene oxide, styrene oxide, phenyl glycidyl ether, or fatty glycidyl ethers; block silicone copolyols comprising polydimethylsiloxane segments and polyoxyethylene segments, particularly those with small siloxane segments.

Polyhydroxyl materials include: methyl cellulose, hydroxyethyl cellulose, hydroxypropyl cellulose, carboxymethyl cellulose and hydrophobically modified analogs, provided that the level of hydrophobic substitution is not sufficient to make the nanoparticle on which the polymer is adsorbed hydrophobic; polyvinyl acetate with sufficient hydrolysis to provide hydrophilicity; and polyvinyl alcohol and hydrophobically modified polyvinyl alcohol, provided that the level of hydrophobe is not sufficient to render the nanoparticle on which the polymer is adsorbed hydrophobic.

Also included are polyphosphates and phosphonates, such as, polyphosphoric acid salts.

Hydrophobic Surface Polymers

Alkylated polyamines include: polyethyleneimine alkylated with fatty alkylating agents such as dodecyl bromide, octadecyl bromide, oleyl chloride, dodecyl glycidyl ether and benzyl chloride or mixtures thereof; and polyethyleneimine acylated with fatty acylating agents such as methyl dodecanoate and oleyl chloride.

Silicones include: polydimethylsiloxane having pendant aminopropyl or aminoethylaminopropyl groups.

Fluorinated polymers include: polymers including as monomers (meth)acrylate esters of perfluorinated or highly fluorinated alkyl groups.

Non-Polymeric Materials

Molecules with at least one segment or group which comprises functionality that serves to anchor or enhance adsorption on nanoparticle surfaces. These molecules also comprise at least one segment or group that serves to provide either hydrophilic or hydrophobic character to the molecule when adsorbed on a nanoparticle. Note that in some cases, the anchoring segment may also serve as the hydrophilizing segment.

Examples of the anchoring segments or groups that may also serve as the hydrophilizing segment include amino groups, quaternized amino groups, and corresponding amine oxides groups; and zwitterionic groups.

Examples of the hydrophobizing segments or groups include alkyl, aryl, alkaryl, and fluoroalkyl surfactants. with cationic, zwitterionic, semi-polar, nonionic, or anionic head groups.

Examples of Non-Polymeric Surface Modifying Materials

Fatty amines and quats including: ditallowdimethylammonium chloride; octadecyltrimethylammonium bromide; dioleyl amine; and Benzyltetradecyldimethylammonium chloride.

Examples of fluorocarbon-based surfactants include: 1-propanaminium, 3-[[(heptadecafluorooctyl)sulfonyl]amino]-N,N,N-trimethyl-, iodide (9CI)

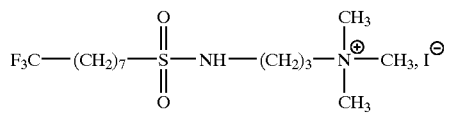

1-propanaminium, 3-[(8-chloro-2,2,3,3,4,4,5,5,6,6,7,7,8,8-tetradecafluoro-1-oxooctyl)amino]-N,N,N-trimethyl-, methyl sulfate (9CI)

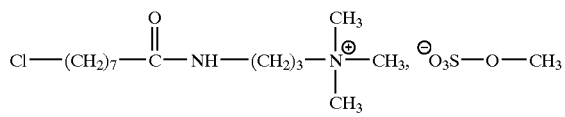

Silicone-based surfactants include: I-propanaminium, N,N,N-trimethyl-3-[1,3,3,3-tetramethyl-1-[(trimethylsilyl)oxy]disiloxanyl]-, bromide (9CI)

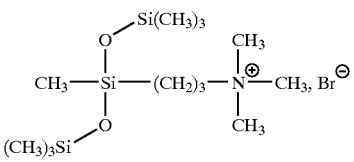

Fatty zwitterionic surfactants include: 1-dodecanaminium, N-(2-hydroxy-3-sulfopropyl)-N,N-dimethyl-, inner salt (9CI)

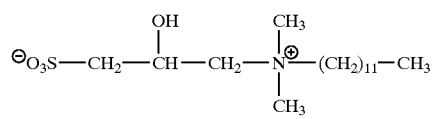

Fatty amine oxides such as hexadecyldimethylamine oxide are included. Fatty anionic surfactants including: Sodium oleyl sulfate; potassium oleate; sodium dodecylbenzenesulfonate; xodium tetradecyl sulfate; and disodium 2-hexadecenylbutanedioate.

Surfactant

Surfactant is an optional ingredient of the present invention. Surfactant is especially useful in the coating composition to facilitate the dispersion of nanoparticles onto a hard surface. Such surfactant is alternatively included when the coating composition is used to treat a hydrophobic hard surface or when the coating composition is applied with a spray dispenser in order to enhance the spray characteristics of the coating composition and allow the coating composition, including the nanoparticles, to distribute more evenly. The spreading of the coating composition can also allow it to dry faster, so that the treated material is ready to use sooner. For concentrated compositions, the surfactant facilitates the dispersion of many adjunct ingredients such as antimicrobial actives and perfumes in the concentrated aqueous compositions. Suitable surfactant useful in the present invention is surfactant selected from the group consisting of anionic surfactants, cationic surfactants, nonionic surfactants, amphoteric surfactants, zwitterionic surfactants and mixtures thereof.

When a surfactant is used in the coating composition of the present invention, it is added at an effective amount to provide one, or more of the benefits described herein, typically from about 0.01% to about 5%, alternatively from about 0.01% to about 3%, alternatively from about 0.01% to about 0.5%, by weight of the usage composition.

An alternative type of surfactant is ethoxylated surfactant, such as addition products of ethylene oxide with fatty alcohols, fatty acids, fatty amines, etc. Optionally, addition products of mixtures of ethylene oxide and propylene oxide with fatty alcohols, fatty acids, and fatty amines can be used. The ethoxylated surfactant includes compounds having the general formula:

$$R^8\text{-Z-}(CH_2CH_2O)_sB$$

wherein $R^8$ is an alkyl group or an alkyl aryl group, selected from the group consisting of primary, secondary and branched chain alkyl hydrocarbyl groups, primary, secondary and branched chain alkenyl hydrocarbyl groups, and/or primary, secondary and branched chain alkyl- and alkenyl-substituted phenolic hydrocarbyl groups having from about 6 to about 20 carbon atoms, alternatively from about 8 to about 18, alternatively from about 10 to about 15 carbon atoms; s is an integer from about 2 to about 45, alternatively from about 2 to about 20, alternatively from about 2 to about 15; B is a hydrogen, a carboxylate group, or a sulfate group; and linking group Z is —O—, —C(O)O—, or —C(O)N(R)—, and mixtures thereof, in which R, when present, is $R^8$ or hydrogen.

The nonionic surfactants herein are characterized by an HLB (hydrophilic-lipophilic balance) of from 5 to 20, alternatively from 6 to 15.

Nonlimiting examples of alternative ethoxylated surfactant are:

straight-chain, primary alcohol ethoxylates, with $R^8$ being $C_8$–$C_{18}$ alkyl and/or alkenyl group, alternatively $C_{10}$–$C_{14}$, and s being from about 2 to about 8;

straight-chain, secondary alcohol ethoxylates, with $R^8$ being $C_8$–$C_{18}$ alkyl and/or alkenyl, e.g., 3-hexadecyl, 2-octadecyl, 4-eicosanyl, and 5-eicosanyl, and s being from about 2 to about 10;

alkyl phenol ethoxylates wherein the alkyl phenols having an alkyl or alkenyl group containing from 3 to 20 carbon atoms in a primary, secondary or branched chain configuration, alternatively from 6 to 12 carbon atoms, and s is from about 2 to about 12;

branched chain alcohol ethoxylates, wherein branched chain primary and secondary alcohols (or Guerbet alcohols), which are available, e.g., from the well-known "OXO" process or modification thereof, are ethoxylated.

Other examples of alternative ethoxylated surfactants include carboxylated alcohol ethoxylate, also known as ether carboxylate, with $R^8$ having from about 12 to about 16 carbon atoms and s being from about 5 to about 13; ethoxylated quaternary ammonium surfactants, such as PEG-5 cocomonium methosulfate, PEG-15 cocomonium chloride, PEG-15 oleammonium chloride and bis(polyethoxyethanol)tallow ammonium chloride.

Other suitable nonionic ethoxylated surfactants are ethoxylated alkyl amines derived from the condensation of ethylene oxide with hydrophobic alkyl amines, with $R^8$ having from about 8 to about 22 carbon atoms and s being from about 3 to about 30.

Also suitable nonionic ethoxylated surfactants for use herein include alkylpolysaccharides, which are disclosed in U.S. Pat. No. 4,565,647, Llenado, issued Jan. 21, 1986, having a hydrophobic group containing from about 8 to about 30 carbon atoms, alternatively from about 10 to about 16 carbon atoms and a polysaccharide, e.g., a polyglycoside, hydrophilic group containing from about 1.3 to about 10, alternatively from about 1.3 to about 3. Any reducing saccharide containing 5 or 6 carbon atoms can be used, e.g., glucose, galactose and galactosyl moieties can be substituted for the glucosyl moieties. The intersaccharide bonds can be, e.g., between the one position of the additional saccharide units and the 2-, 3-, 4-, and/or 6-positions on the preceding saccharide units. The alternative alkylpolyglycosides have the formula:

$$R^2O(C_nH_{2n}O)t(glycosyl)_x$$

wherein $R^2$ is selected from the group consisting of alkyl, alkylphenyl, hydroxyalkyl, hydroxyalkylphenyl, and mixtures thereof in which the alkyl groups contain from 10 to 18, alternatively from 12 to 14, carbon atoms; n is 2 or 3, t is from 0 to about 10; and x is from about 1.3 to about 10 alternatively. The glycosyl is alternatively derived from glucose.

Another class of alternative surfactants that are useful in the formulation of the coating compositions of the present invention, to solubilize and/or disperse silicone lubricants and/or silicone-containing adjunct shape retention copolymers, are silicone surfactants. Also known as silicone superwetting agents. They can be used alone and/or alternatively in combination with the alternative alkyl ethoxylate surfactants described herein above. Nonlimiting examples of silicone surfactants are the polyalkylene oxide polysiloxanes having a dimethyl polysiloxane hydrophobic moiety and one or more hydrophilic polyalkylene side chains, and having the general formula:

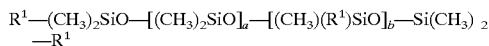

wherein a+b are from about 1 to about 50 alternatively, and each $R^1$ is the same or different and is selected from the group consisting of methyl and a poly(ethyleneoxide/propyleneoxide) copolymer group having the general formula:

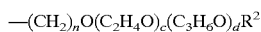

wherein n is 3 or 4; total c (for all polyalkyleneoxy side groups) has a value of from 1 to about 100, alternatively from about 6 to about 100; total d is from 0 to about 14; alternatively d is 0; total c+d has a value of from about 5 to about 150, alternatively from about 9 to about 100 and each $R^2$ is the same or different and is selected from the group consisting of hydrogen, an alkyl having 1 to 4 carbon atoms, and an acetyl group, alternatively hydrogen and methyl group. Each polyalkylene oxide polysiloxane has at least one $R^1$ group being a poly(ethyleneoxide/propyleneoxide) copolymer group.

Nonlimiting examples of this type of surfactants are the Silwet® surfactants, which are available OSi Specialties, Inc., Danbury, Conn. Representative Silwet surfactants which contain only ethyleneoxy ($C_2H_4O$) groups are as follows.

| Name | Average MW | Average a + b | Average total c |
|---|---|---|---|
| L-7608 | 600 | 1 | 9 |
| L-7607 | 1,000 | 2 | 17 |
| L-77 | 600 | 1 | 9 |
| L-7605 | 6,000 | 20 | 99 |
| L-7604 | 4,000 | 21 | 53 |
| L-7600 | 4,000 | 11 | 68 |
| L-7657 | 5,000 | 20 | 76 |
| L-7602 | 3,000 | 20 | 29 |
| L-7622 | 10,000 | 88 | 75 |

The molecular weight of the polyalkyleneoxy group ($R^1$) is less than or equal to about 10,000. Alternatively, the molecular weight of the polyalkyleneoxy group is less than or equal to about 8,000, and most alternatively ranges from about 300 to about 5,000. Thus, the values of c and d can be those numbers which provide molecular weights within these ranges. However, the number of ethyleneoxy units (—$C_2H_4O$) in the polyether chain ($R^1$) must be sufficient to render the polyalkylene oxide polysiloxane water dispersible or water soluble. If propyleneoxy groups are present in the polyalkylenoxy chain, they can be distributed randomly in the chain or exist as blocks. Surfactants which contain only propyleneoxy groups without ethyleneoxy groups are not preferred. Alternative Silwet surfactants are L-77, L-7280, L-5550, L-7280, L7608, L7607, and mixtures thereof.

Another nonlimiting example of this type of surfactant are silicone superwetting agents available from Dow Corning and sold as silicone superwetting agents such as silicone glycol copolymers (e.g. Q2- 5211 and Q2-5212).

Other useful silicone surfactants are those having a hydrophobic moiety and hydrophilic ionic groups, including, e.g., anionic, cationic, and amphoteric groups. Nonlimiting examples of anionic silicone surfactants are silicone sulfosuccinates, silicone sulfates, silicone phosphates, silicone carboxylates, and mixtures thereof, as disclosed respectively in U.S. Pat. Nos. 4,717,498; 4,960,845; 5,149,765 and 5,296,434. Nonlimiting examples of cationic silicone surfactants are silicone alkyl quats (quaternary ammoniums), silicone amido quats, silicone imidazoline quats, and mixtures thereof, as disclosed respectively in U.S. Pat. Nos. 5,098,979; 5,135,294 and 5,196,499. Nonlimiting examples of amphoteric silicone surfactants are silicone betaines, silicone amino proprionates, silicone phosphobetaines, and mixtures thereof, as disclosed respectively in U.S. Pat. Nos. 4,654,161; 5,073,619 and 5,237,035. All of these patents are incorporated herein by reference.

The coating composition of the present invention to be used in the automatic dishwashing cycle can be either used along with a general detergent or actually as a rinse aid in the rinsing or drying cycle. The coating compositions according to the present invention comprise a nanoparticle system and optionally a surfactant or surfactant system wherein the surfactant can be selected from nonionic and/or anionic and/or cationic and/or ampholytic and/or zwitterionic and/or semi-polar nonionic surfactants.

The surfactant is typically present at a level of from about 0.01% to about 5% by weight. More alternative levels of incorporation are about 0.01% to about 3% by weight, most alternatively from 0.01% to 0.5% by weight of coating compositions in accord with the invention.

The surfactant is alternatively formulated to be compatible with the nanoparticle system, suitable carrier medium and optional adjunct ingredients present in the coating composition.

Examples of suitable nonionic, anionic, cationic, ampholytic, zwitterionic and semi-polar nonionic surfactants are disclosed in U.S. Pat. Nos. 5,707,950 and 5,576,282, incorporated herein by reference.

Other nonlimiting examples of nonionic surfactants are polyhydroxy fatty acid amide surfactants of the formula:

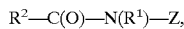
$R^2$—C(O)—N($R^1$)—Z, wherein $R^1$ is H, or $R^1$ is $C_{1-4}$ hydrocarbyl, 2-hydroxy ethyl, 2-hydroxy propyl or a mixture thereof, $R^2$ is $C_{5-31}$ hydrocarbyl, and Z is a polyhydroxyhydrocarbyl having a linear hydrocarbyl chain with at least 3 hydroxyls directly connected to the chain, or an alkoxylated derivative thereof. Alternatively, $R^1$ is methyl, $R^2$ is a straight $C_{11-15}$ alkyl or $C_{16-18}$ alkyl or alkenyl chain such as coconut alkyl or mixtures thereof, and Z is derived from a reducing sugar such as glucose, fructose, maltose, lactose, in a reductive amination reaction.

Alternative anionic surfactants include alkyl alkoxylated sulfate surfactants hereof are water soluble salts or acids of the formula $RO(A)_mSO3M$ wherein R is an unsubstituted $C_{10}$–$C_{24}$ alkyl or hydroxyalkyl group having a $C_{10}$–$C_{24}$ alkyl component, alternatively a $C_{12}$–$C_{20}$ alkyl or hydroxyalkyl, alternatively $C_{12}$–$C_{18}$ alkyl or hydroxyalkyl, A is an ethoxy or propoxy unit, m is greater than zero, typically between about 0.5 and about 6, alternatively between about 0.5 and about 3, and M is H or a cation which can be, for example, a metal cation (e.g., sodium, potassium, lithium, calcium, magnesium, etc.), ammonium or substituted-ammonium cation. Alkyl ethoxylated sulfates as well as alkyl propoxylated sulfates are contemplated herein.

When included therein, the coating compositions of the present invention typically comprise from about 0.01% to about 5%, alternatively from about 0.01% to about 3% by weight of such anionic surfactants.

Alternative cationic surfactants are the water-soluble quaternary ammonium compounds useful in the present composition having the formula:

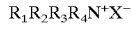
$R_1R_2R_3R_4N^+X^-$ wherein $R_1$ is $C_8$–$C_{16}$ alkyl, each of $R_2$, $R_3$ and $R_4$ is independently $C_1$–$C_4$ alkyl, $C_1$–$C_4$ hydroxy alkyl, benzyl, and —$(C_2H_{4O})_xH$ where x has a value from 2 to 5, and X is an anion. Not more than one of $R_2$, $R_3$ or $R_4$ should be benzyl.

When included therein, the coating compositions of the present invention typically comprise from 0.01% to about 15%, alternatively from about 0.01% to about 3% by weight of such cationic surfactants.

When included therein, the coating compositions of the present invention typically comprise from 0.01% to about 15%, alternatively from about 0.01% to about 3% by weight of such ampholytic surfactants.

When included therein, the coating compositions of the present invention typically comprise from 0.01% to about 15%, alternatively from about 0.01% to about 5% by weight of such zwitterionic surfactants.

When included therein, the coating compositions of the present invention typically comprise from 0.01% to about 15%, alternatively from about 0.01% to about 5% by weight of such semi-polar nonionic surfactants.

The detergent composition of the present invention can further comprise a cosurfactant selected from the group of primary or tertiary amines.

Suitable primary amines for use herein include amines according to the formula $R_1NH_2$ wherein $R_1$ is a $C_6$–$C_{12}$, alternatively $C_6$–$C_{10}$ alkyl chain or $R_4X(CH_2)_n$, X is —O—, —C(O)NH— or —NH—, $R_4$ is a $C_6$–$C_{12}$ alkyl chain n is between 1 to 5, alternatively 3. $R_1$ alkyl chains can be straight or branched and can be interrupted with up to 12, alternatively less than 5 ethylene oxide moieties.

Alternative amines according to the formula herein above are n-alkyl amines. Suitable amines for use herein can be selected from 1-hexylamine, 1-octylamine, 1-decylamine and laurylamine. Other alternative primary amines include $C_8$–$C_{10}$ oxypropylamine, octyloxypropylamine, 2-ethylhexyl-oxypropylamine, lauryl amido propylamine and amido propylamine.

Suitable tertiary amines for use herein include tertiary amines having the formula $R_1R_2R_3N$ wherein $R_1$ and $R_2$ are $C_1$–$C_8$ alkyl chains or

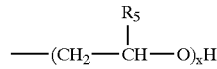
$$—(CH_2—\overset{R_5}{\underset{|}{CH}}—O)_xH$$

$R_3$ is either a $C_6$–$C_{12}$, alternatively $C_6$–$C_{10}$ alkyl chain, or $R_3$ is $R_4X(CH_2)_n$, whereby X is —O—, —C(O)NH— or —NH—$R_4$ is a $C_4$–$C_{12}$, n is between 1 to 5, alternatively 2–3, $R_5$ is H or $C_1$–$C_2$ alkyl and x is between 1 to 6.

$R_3$ and $R_4$ can be linear or branched; $R_3$ alkyl chains can be interrupted with up to 12, alternatively less than 5, ethylene oxide moieties.

Alternative tertiary amines are $R_1R_2R_3N$ where $R_1$ is a $C_6$–$C_{12}$ alkyl chain, $R_2$ and $R_3$ are $C_1$–$C_3$ alkyl or

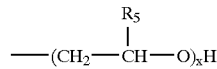
$$—(CH_2—\overset{R_5}{\underset{|}{CH}}—O)_xH$$

where $R_5$ is H or $CH_3$ and x=1–2.

Alternatives are the amidoamines of the formula:

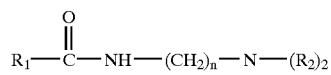
$$R_1—\overset{O}{\underset{||}{C}}—NH—(CH_2)_n—N—(R_2)_2$$

wherein $R_1$ is $C_6$–$C_{12}$ alkyl; n is 2–4, alternatively n is 3; $R_2$ and $R_3$ is $C_1$–$C_4$.

Alternative amines of the present invention include 1-octylamine, 1-hexylamine, 1-decylamine, 1-dodecylamine, C8–10oxypropylamine, N coco 1–3diaminopropane, coconutalkyldimethylamine, lauryldimethylamine, lauryl bis(hydroxyethyl)amine, coco bis(hydroxyethyl)amine, lauryl amine 2 moles propoxylated, octyl amine 2 moles propoxylated, lauryl amidopropyldimethylamine, C8–10 amidopropyldimethylamine and C10 amidopropyldimethylamine.

Alternative amines for use in the coating compositions herein are 1-hexylamine, 1-octylamine, 1-decylamine, 1-dodecylamine. Especially desirable are n-dodecyldimethylamine and bishydroxyethylcoconutalkylamine and oleylamine 7 times ethoxylated, lauryl amido propylamine and cocoamido propylamine.

Alternative Adjunct Materials

Aminocarboxylate Chelators

Chelators, e.g., ethylenediaminetetraacetic acid (EDTA), hydroxyethylenediaminetriacetic acid, diethylenetriaminepentaacetic acid, and other aminocarboxylate chelators, and mixtures thereof, and their salts, and mixtures thereof, can optionally be used to increase antimicrobial and preservative effectiveness against Gram-negative bacteria, especially *Pseudomonas* species. Although sensitivity to EDTA and other aminocarboxylate chelators is mainly a characteristic of *Pseudomonas* species, other bacterial species highly susceptible to chelators include *Achromobacter, Alcaligenes, Azotobacter, Escherichia, Salmonella, Spirillum*, and *Vibrio*. Other groups of organisms also show increased sensitivities to these chelators, including fungi and yeasts. Furthermore, aminocarboxylate chelators can help, e.g., maintaining product clarity, protecting fragrance and perfume components, and preventing rancidity and off odors.

Although these aminocarboxylate chelators may not be potent biocides in their own right, they function as potentiators for improving the performance of other antimicrobials/preservatives in the coating compositions of the present invention. Aminocarboxylate chelators can potentiate the performance of many of the cationic, anionic, and nonionic antimicrobials/preservatives, phenolic compounds, and isothiazolinones, that are used as antimicrobials/preservatives in the coating composition of the present invention. Nonlimiting examples of cationic antimicrobials/preservatives potentiated by aminocarboxylate chelators in solutions are chlorhexidine salts (including digluconate, diacetate, and dihydrochloride salts), and Quaternium-15, also known as Dowicil 200, Dowicide Q, Preventol D1, benzalkonium chloride, cetrimonium, myristalkonium chloride, cetylpyridinium chloride, lauryl pyridinium chloride, and the like. Nonlimiting examples of useful anionic antimicrobials/preservatives which are enhanced by aminocarboxylate chelators are sorbic acid and potassium sorbate. Nonlimiting examples of useful nonionic antimicrobials/preservatives which are potentiated by aminocarboxylate chelators are DMDM hydantoin, phenethyl alcohol, monolaurin, imidazolidinyl urea, and Bronopol (2-bromo-2-nitropropane-1,3-diol).

Examples of useful phenolic antimicrobials/preservatives potentiated by these chelators are chloroxylenol, phenol, tert-butyl hydroxyanisole, salicylic acid, resorcinol, and sodium o-phenyl phenate. Nonlimiting examples of isothiazolinone antimicrobials/preservatives which are enhanced by aminocarboxylate chelators are Kathon, Proxel and Promexal.

The optional chelators are present in the coating compositions of this invention at levels of, typically, from about 0.01% to about 0.3%, alternatively from about 0.02% to about 0.1% by weight of the usage compositions to provide antimicrobial efficacy in this invention.

Free, uncomplexed aminocarboxylate chelators are required to potentiate the efficacy of the antimicrobials. Thus, when excess alkaline earth (especially calcium and magnesium) and transitional metals (iron, manganese, copper, and others) are present, free chelators are not available and antimicrobial potentiation is not observed. In the case where significant water hardness or transitional metals are available or where product esthetics require a specified chelator level, higher levels may be required to allow for the availability of free, uncomplexed aminocarboxylate chelators to function as antimicrobial/preservative potentiators.

Other Optional Ingredients

The coating composition of the present invention can optionally contain adjunct odor-controlling materials, chelating agents, antistatic agents, insect and moth repelling agents, colorants, bluing agents, antioxidants, and mixtures thereof in addition to the cyclic silicone molecules. These optional ingredients exclude the other ingredients specifically mentioned hereinbefore. Incorporating adjunct odor-controlling materials can enhance the capacity of the cyclodextrin to control odors as well as broaden the range of odor types and molecule sizes which can be controlled. Such materials include but are not limited to for example, metallic salts, zeolites, water-soluble bicarbonate salts, antimicrobial preservatives, UV absorbers, and mixtures thereof.

Antimicrobial Preservative

Optionally, but alternatively, an antimicrobial preservative can be added to the coating composition of the present invention, alternatively solubilized, water-soluble, antimicrobial preservative, to protect the composition. Growth of microorgamisms in the coating composition can lead to the problem of storage stability of hard surface coating solutions for any significant length of time. Contamination by certain microorganisms with subsequent microbial growth can result in an unsightly and/or malodorous solution. Because microbial growth in the hard surfaces is highly objectionable when it occurs, it is highly preferable to include an antimicrobial preservative, alternatively solubilized, water-soluble, antimicrobial preservative, which is effective for inhibiting and/or regulating microbial growth in order to increase storage stability of the alternatively clear, aqueous containing the hard surface coating composition.

It is preferable to use a broad spectrum preservative, e.g., one that is effective on both bacteria (both gram positive and gram negative) and fungi. A limited spectrum preservative, e.g., one that is only effective on a single group of microorganisms, e.g., fungi, can be used in combination with a broad spectrum preservative or other limited spectrum preservatives with complimentary and/or supplementary activity. A mixture of broad-spectrum preservatives can also be used. In some cases where a specific group of microbial contaminants is problematic (such as Gram negatives), aminocarboxylate chelators can be used alone or as potentiators in conjunction with other preservatives. These chelators which include, e.g., ethylenediaminetetraacetic acid (EDTA), hydroxyethylenediaminetriacetic acid, diethylenetriaminepentaacetic acid, and other aminocarboxylate chelators, and mixtures thereof, and their salts, and mixtures thereof, can increase preservative effectiveness against Gram-negative bacteria, especially *Pseudomonas* species.

Antimicrobial preservatives useful in the present invention include biocidal compounds, i.e., substances that kill microorganisms, or biostatic compounds, i.e., substances that inhibit and/or regulate the growth of microorganisms. Suitable preservatives are disclosed in U.S. Pat. Nos. 5,534,165; 5,578,563; 5,663,134; 5,668,097; 5,670,475; and 5,714,137, Trinh et al. issued Jul. 9, 1996; Nov. 26, 1996; Sep. 2, 1997; Sep. 16, 1997; Sep. 23, 1997; and Feb. 3, 1998 respectively, all of said patents being incorporated hereinbefore by reference. Many antimicrobial preservatives are given under the section on Antimicrobial Active given herein above. Water insoluble antimicrobial preservatives such as paraben and triclosan are useful in the coating compositions of the present invention, but they require the use of a solubilizer, an emulsifier, a dispersing agent, or the like, such as a surfactant and/or cyclodextrin to effectively distribute said preservative in the liquid composition. Alternative antimicrobial preservatives are those that are water-soluble and are effective at low levels. Water-soluble preservatives useful in the present invention are those that have a solubility in water of at least about 0.3 g per 100 ml of water, i.e., greater than about 0.3% at room temperature, alternatively greater than about 0.5% at room temperature.

The water-soluble antimicrobial preservative in the present invention is included at an effective amount. The term "effective amount" as herein defined means a level sufficient to prevent spoilage, or prevent growth of inadvertently added microorganisms, for a specific period of time. In other words, the preservative is not being used to kill microorganisms on the surface onto which the coating composition is deposited in order to eliminate odors produced by microorganisms. Instead, it is alternatively being used to prevent spoilage of the hard surface coating composition in order to increase the shelf life of the coating composition. Alternative levels of preservative are from about 0.0001% to about 0.5%, alternatively from about 0.0002% to about 0.2%, alternatively from about 0.0003% to about 0.1%, by weight of the usage composition.

The preservative can be any organic preservative material which will not cause damage to hard surface appearance, e.g., discoloration, coloration, bleaching. Alternative water-soluble preservatives include organic sulfur compounds, halogenated compounds, cyclic organic nitrogen compounds, low molecular weight aldehydes, quaternary ammonium compounds, dehydroacetic acid, phenyl and phenolic compounds, and mixtures thereof.

The preservatives of the present invention can be used in mixtures in order to control a broad range of microorganisms.

Bacteriostatic effects can sometimes be obtained for aqueous compositions by adjusting the coating composition pH to an acid pH, e.g., less than about pH 4, alternatively less than about pH 3, or a basic pH, e.g., greater than about 10, alternatively greater than about 11.

UV Absorbers

Not to be bound by theory, but UV absorbers can operate by protecting the coating deposited on the hard surface from UV exposure. UV light is know to initiate auto-oxidation processes and UV absorbers can be deposited on hard surface in such a way that UV light is blocked from the hard surface and unsaturated fatty materials, thus preventing the initiation of auto-oxidation.

Oxidative Stabilizers

Oxidative stabilizers can be present in the coating compositions of the present invention and these prevent yellowing by acting as a scavenger for the oxidative processes, thus preventing and/or terminating auto-oxidation, or by reversing oxidation and thus reversing yellowing. The term "oxidative stabilizer," as used herein, includes antioxidants and reductive agents. These agents are present at a level of from 0% to about 2%, alternatively from about 0.01% to about 0.2%, alternatively from about 0.035% to about 0.1% for antioxidants, and, alternatively, from about 0.01% to about 0.2% for reductive agents.

Examples of antioxidants that can be added to the coating compositions and in the processing of this invention include a mixture of ascorbic acid, ascorbic palmitate, propyl gallate, available from Eastman Chemical Products, Inc., under the trade names Tenox® PG and Tenox® S-1; a mixture of BHT (butylated hydroxytoluene), BHA (butylated hydroxyanisole), propyl gallate, and citric acid, available from Eastman Chemical Products, Inc., under the trade name Tenox®-6; butylated hydroxytoluene, available from UOP Process Division under the trade name Sustane® BHT; tertiary butylhydroquinone, Eastman Chemical Products, Inc., as Tenox® TBHQ; natural tocopherols, Eastman Chemical Products, Inc., as Tenox® GT-1/GT-2; and butylated hydroxyanisole, Eastman Chemical Products, Inc., as BHA; long chain esters ($C_8$–$C_{22}$) of gallic acid, e.g., dodecyl gallate; Irganox® 1010; Irganox® 1035; Irganox® B 1171; Irganox® 1425; Irganox® 3114; Irganox® 3125; and mixtures thereof; alternatively Irganox® 3125, Irganox® 1425, Irganox® 3114, and mixtures thereof; alternatively Irganox® 3125 alone or mixed with citric acid and/or other chelators such as isopropyl citrate, Dequest® 2010, available from Monsanto with a chemical name of 1-hydroxyethylidene-1,1-diphosphonic acid (etidronic acid), and Tiron®, available from Kodak with a chemical name of 4,5-dihydroxy-m-benzene-sulfonic acid/sodium salt, and DTPA®, available from Aldrich with a chemical name of diethylenetriaminepentaacetic acid.

Oxidative stabilizers can also be added at any point during the process. These assure good odor stability under long-term storage conditions.

Colorant

Colorants, dyes, and bluing agents can be optionally added to the coating compositions for visual appeal and performance impression. When colorants are used, they are used at extremely low levels to avoid hard surface staining. Alternative colorants for use in the present compositions are highly water-soluble dyes, e.g., Liquitint® dyes available from Milliken Chemical Co. Non-limiting examples of suitable dyes are, Liquitint Blue HP®, Liquitint Blue 65®, Liquitint Pat. Blue®, Liquitint Royal Blue®, Liquitint Experimental Yellow 8949-43®, Liquitint Green HMC®, Liquitint Yellow II®, and mixtures thereof, alternatively Liquitint Blue HP®, Liquitint Blue 65®, Liquitint Pat. Blue®, Liquitint Royal Blue®, Liquitint Experimental Yellow 8949-43®, and mixtures thereof.

Builders

The coating compositions according to the present invention can further comprise a builder or builder system, especially for coating compositions. Any conventional builder system is suitable for use herein including aluminosilicate materials, silicates, polycarboxylates, alkyl- or alkenyl-succinic acid and fatty acids, materials such as ethylenediamine tetraacetate, diethylene triamine pentamethyleneacetate, metal ion sequestrants such as aminopolyphosphonates, particularly ethylenediamine tetramethylene phosphonic acid and diethylene triamine pentamethylenephosphonic acid. Phosphate builders can also be used herein.

The present invention can include a suitable builder or detergency salt. The level of detergent salt/builder can vary widely depending upon the end use of the coating composition and its desired physical form. When present, the coating compositions will typically comprise at least about 1% builder and more typically from about 10% to about 80%, even more typically from about 15% to about 50% by weight, of the builder. Lower or higher levels, however, are not meant to be excluded.

Inorganic or P-containing detergent salts include, but are not limited to, the alkali metal, ammonium and alkanolammonium salts of polyphosphates (exemplified by the tripolyphosphates, pyrophosphates, and glassy polymeric meta-phosphates), phosphonates, phytic acid, silicates, carbonates (including bicarbonates and sesquicarbonates), sulphates, and aluminosilicates. However, non-phosphate salts are required in some locales. Importantly, the coating compositions herein function surprisingly well even in the presence of the so-called "weak" builders (as compared with phosphates) such as citrate, or in the so-called "underbuilt" situation that may occur with zeolite or layered silicate builders.

Organic detergent builders suitable for the purposes of the present invention include, but are not restricted to, a wide variety of polycarboxylate compounds. As used herein, "poly-carboxylate" refers to compounds having a plurality of carboxylate groups, alternatively at least 3 carboxylates. Polycarboxylate builder can generally be added to the coating composition in acid form, but can also be added in the form of a neutralized salt. When utilized in salt form, alkali metals, such as sodium, potassium, and lithium, or alkanolammonium salts are alternatives.

Examples of suitable silicate builders, carbonate salts, aluminosilicate builders, polycarboxylate builders, citrate builders, 3,3-dicarboxy-4-oxa-1,6-hexanedioate builders and related compounds disclosed in U.S. Pat. No. 4,566,984, to Bush, succinic acid builders, phosphorous-based builders and fatty acids, is disclosed in U.S. Pat. Nos. 5,576,282, 5,728,671 and 5,707,950.

Additional suitable builders can be an inorganic ion exchange material, commonly an inorganic hydrated aluminosilicate material, more particularly a hydrated synthetic zeolite such as hydrated zeolite A, X, B, HS or MAP.

Specific polycarboxylates suitable for the present invention are polycarboxylates containing one carboxy group include lactic acid, glycolic acid and ether derivatives thereof as disclosed in Belgian Pat. Nos. 831,368, 821,369 and 821,370. Polycarboxylates containing two carboxy groups include the water-soluble salts of succinic acid, malonic acid, (ethylenedioxy) diacetic acid, maleic acid, diglycollic acid, tartaric acid, tartronic acid and fumaric acid, as well as the ether carboxylates described in German Offenlegenschrift 2,446,686, and 2,446,687 and U.S. Pat. No. 3,935,257 and the sulfinyl carboxylates described in Belgian Pat. No. 840,623. Polycarboxylates containing three carboxy groups include, in particular, water-soluble citrates, aconitrates and citraconates as well as succinate derivatives such as the carboxymethyloxysuccinates described in British Pat. No. 1,379,241, lactoxysuccinates described in Netherlands Application 7205873, and the oxypolycarboxylate materials such as 2-oxa-1,1,3-propane tricarboxylates described in British Pat. No. 1,387,447.

Polycarboxylates containing four carboxy groups include oxydisuccinates disclosed in British Pat. No. 1,261,829, 1,1,2,2-ethane tetracarboxylates, 1,1,3,3-propane tetracarboxylates and 1,1,2,3-propane tetracarboxylates. Polycarboxylates containing sulfo substituents include the sulfosuccinate derivatives disclosed in British Pat. Nos. 1,398,421 and 1,398,422 and in U.S. Pat. No. 3,936,448, and the sulfonated pyrolysed citrates described in British Pat. No. 1,082,179, while polycarboxylates containing phosphone substituents is disclosed in British Pat. No. 1,439,000.

Alicyclic and heterocyclic polycarboxylates include cyclopentane-cis,cis,cis-tetracarboxylates, cyclopentadienide pentacarboxylates, 2,3,4,5-tetrahydro-furan-cis, cis, cis-tetracarboxylates, 2,5-tetrahydro-furan-cis-dicarboxylates, 2,2,5,5-tetrahydrofuran-tetracarboxylates, 1,2,3,4,5,6-hexane-hexacarboxylates and carboxymethyl derivatives of polyhydric alcohols such as sorbitol, mannitol and xylitol. Aromatic poly-carboxylates include mellitic acid, pyromellitic acid and the phthalic acid derivatives disclosed in British Pat. No. 1,425,343.

Of the above, the alternative polycarboxylates are hydroxycarboxylates containing up to three carboxy groups per molecule, more particularly citrates.

Builder systems for use in the present compositions include a mixture of a water-insoluble aluminosilicate builder such as zeolite A or of a layered silicate (SKS-6), and a water-soluble carboxylate-chelating agent such as citric acid.

Builder systems include a mixture of a water-insoluble aluminosilicate builder such as zeolite A, and a water-soluble carboxylate chelating agent such as citric acid. Builder systems for use in liquid, coating compositions of the present invention are soaps and polycarboxylates.

Other suitable water-soluble organic salts are the homo- or copolymeric acids or their salts, in which the polycarboxylic acid comprises at least two carboxyl radicals separated from each other by not more than two carbon atoms. Polymers of this type are disclosed in GB-A-1,596,756. Examples of such salts are polyacrylates of MW 2000–5000 and their copolymers with maleic anhydride, such copolymers having a molecular weight of from 20,000 to 70,000, especially about 40,000.

Detergency builder salts are normally included in amounts of from 5% to 80% by weight of the coating composition alternatively from 10% to 70% and most usually from 30% to 60% by weight.

Suds Suppressor

Another optional ingredient is a suds suppressor, exemplified by silicones, and silica-silicone mixtures. Examples of suitable suds suppressors are disclosed in U.S. Pat. Nos. 5,707,950 and 5,728,671. These suds suppressors are normally employed at levels of from 0.001% to 2% by weight of the coating composition, alternatively from 0.01% to 1% by weight.

Enzymes

Enzymes can be included in the present detergent compositions for a variety of purposes, including removal of protein-based, carbohydrate-based, or triglyceride-based stains from surfaces such as textiles or dishes, for the prevention of refugee dye transfer, for example in laundering, and for fabric restoration. Suitable enzymes include proteases, amylases, lipases, cellulases, peroxidases, and mixtures thereof of any suitable origin, such as vegetable, animal, bacterial, fungal and yeast origin. Alternative selections are influenced by factors such as pH-activity and/or stability optima, thermostability, and stability to active detergents, builders and the like. In this respect bacterial or fungal enzymes are alternatives, such as bacterial amylases and proteases, and fungal cellulases. "Detersive enzyme", as used herein, means any enzyme having a cleaning, stain removing or otherwise beneficial effect in a laundry detergent composition. Alternative detersive enzymes are hydrolases such as proteases, amylases and lipases. Alternative enzymes for laundry purposes include, but are not limited to, proteases, cellulases, lipases and peroxidases.

Enzymes are normally incorporated into detergent or detergent additive compositions at levels sufficient to provide a "cleaning-effective amount". The term "cleaning effective amount" refers to any amount capable of producing a cleaning, stain removal, soil removal, whitening, deodorizing, or freshness improving effect on substrates such as fabrics, dishware and the like. In practical terms for current commercial preparations, typical amounts are up to about 5 mg by weight, more typically 0.01 mg to 3 mg, of active enzyme per gram of the detergent composition. Stated otherwise, the compositions herein will typically comprise from 0.001% to 5%, alternatively 0.01%–1% by weight of a commercial enzyme preparation. Protease enzymes are usually present in such commercial preparations at levels sufficient to provide from 0.005 to 0.1 Anson units (AU) of activity per gram of composition. Higher active levels may also be desirable in highly concentrated detergent formulations.

Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, βglucanases, arabinosidases, hyaluronidase, chondroitinase, laccase, mannanases, more preferably plant cell wall degrading enzymes and non-cell wall-degrading enzymes (WO 98/39403 A) and can, more specifically, include pectinase (WO 98/06808 A, JP10088472 A, JP10088485 A); pectolyase (WO98/06805 Al); pectin lyases free from other pectic enzymes (WO9806807 A1); chondriotinase (EP 747,469 A); xylanase (EP 709,452 A, WO 98/39404 A, WO98/39402 A) including those derived from *microtetraspora flexuosa* (U.S. Pat. No. 5,683,911); isopeptidase (WO 98/16604 A); keratinase (EP 747,470 A, WO 98/40473 A); lipase (GB 2,297, 979 A; WO 96/16153 A; WO 96/12004 A; EP 698,659 A; WO 96/16154 A); cellulase or endoglucanase (GB 2,294, 269 A; WO 96/27649 A; GB 2,303,147 A; WO98/03640 A; see also neutral or alkaline cellulases derived from *chrysosporium lucknowense* strain VKM F-3500D as disclosed in WO9815633 A); polygalacturonase (WO 98/06809 A); mycodextranase (WO 98/13457 A); thermitase (WO 96/28558 A); cholesterol esterase (WO 98 28394 A); or any combination thereof; and known amylases; oxidoreductases; oxidases or combination systems including same (DE19523389 A1); mutant blue copper oxidases (WO9709431 Al), peroxidases (see for example U.S. Pat. No. 5,605,832, WO97/31090 Al), mannanases (WO9711164, WO 99/09126, PCT/US00/00839); xyloglucanases (WO 98/50513, PCT/US/00/00839, WO 99/02663); laccases, see WO9838287 A1 or WO9838286 A1 or for example, those laccase variants having amino acid changes in *myceliophthora* or *scytalidium* laccase(s) as described in WO9827197 A1 or mediated laccase systems as described in DE19612193 A1), or those derived from coprinus strains (see, for example WO9810060 A1 or WO9827198 A1), phenol oxidase or polyphenol oxidase (JP10174583 A) or mediated phenol oxidase systems (WO9711217 A); enhanced phenol oxidase systems (WO 9725468 A WO9725469 A); phenol oxidases fused to an amino acid sequence having a cellulose binding domain (WO9740127 A1, WO9740229 A1) or other phenol oxidases (WO9708325 A, WO9728257 A1) or superoxide dismutases. Oxidoreductases and/or their associated antibodies can be used, for example with $H_2O_2$, as taught in WO 98/07816 A. Depending on the type of composition, other redox-active enzymes can be used, even, for example, catalases (see, for example JP09316490 A).

Suitable examples of proteases are the subtilisins which are obtained from particular strains of *B. subtilis* and *B. licheniformis*. One suitable protease is obtained from a strain of Bacillus, having maximum activity throughout the pH range of 8–12, developed and sold as ESPERASE® by Novo Industries A/S of Denmark, hereinafter "Novo". The preparation of this enzyme and analogous enzymes is described in GB 1,243,784 to Novo. Other suitable proteases include ALCALASE® and SAVINASE® from Novo and MAXATASE® from International Bio-Synthetics, Inc., The Netherlands; as well as Protease A as disclosed in EP 130,756 A, Jan. 9, 1985 and Protease B as disclosed in EP 303,761 A, Apr. 28, 1987 and EP 130,756 A, Jan. 9, 1985. See also a high pH protease from *Bacillus* sp. NCIMB 40338 described in WO 9318140 A to Novo. Enzymatic detergents comprising protease, one or more other enzymes, and a reversible protease inhibitor are described in WO 9203529 A to Novo. Other alternative proteases include those of WO 9510591 A to Procter & Gamble. When desired, a protease having decreased adsorption and increased hydrolysis is available as described in WO 9507791 to Procter & Gamble. A recombinant trypsin-like protease for detergents suitable herein is described in WO 9425583 to Novo.

In more detail, an alternative protease, referred to as "Protease D" is a carbonyl hydrolase variant having an amino acid sequence not found in nature, which is derived from a precursor carbonyl hydrolase by substituting a different amino acid for a plurality of amino acid residues at a position in said carbonyl hydrolase equivalent to position +76, alternatively also in combination with one or more amino acid residue positions equivalent to those selected from the group consisting of +99, +101, +103, +104, +107, +123, +27, +105, +109, +126, +128, +135, +156, +166, +195, +197, +204, +206, +210, +216, +217, +218, +222, +260, +265, and/or +274 according to the numbering of *Bacillus amyloliquefaciens* subtilisin, as described in the patent applications of A. Baeck, et al, entitled "Protease-Containing Cleaning Compositions" having U.S. Ser. No. 08/322,676, and C. Ghosh, et al, "Bleaching Compositions Comprising Protease Enzymes" having U.S. Ser. No. 08/322,677, both filed Oct. 13, 1994.

An alternative protease, "Protease E", is a carbonyl hydrolase variant having an amino acid sequence not found in nature, which is derived from a precursor carbonyl hydrolase by substituting a different amino acid for a plurality of amino acid residues at a position in said carbonyl hydrolase equivalent to position 103 of *Bacillus amyloliquefaciens* subtilisin in combination with a substitution of an amino acid residue with another naturally occurring amino acid residue at one or more amino acid residue positions corresponding to positions 1, 3, 4, 8, 9, 10, 12, 13, 16, 17, 18, 19, 20, 21, 22, 24, 27, 33, 37, 38, 42, 43, 48, 55, 57, 58, 61, 62, 68, 72, 75, 76, 77, 78, 79, 86, 87, 89, 97, 98, 99, 101, 102, 104, 106, 107, 109, 111, 114, 116, 117, 119, 121, 123, 126, 128, 130, 131, 133, 134, 137, 140, 141, 142, 146, 147, 158, 159, 160, 166, 167, 170, 173, 174, 177, 181, 182, 183, 184, 185, 188, 192, 194, 198, 203, 204, 205, 206, 209, 210, 211, 212, 213, 214, 215, 216, 217, 218, 222, 224, 227, 228, 230, 232, 236, 237, 238, 240, 242, 243, 244, 245, 246, 247, 248, 249, 251, 252, 253, 254, 255, 256, 257, 258, 259, 260, 261, 262, 263, 265, 268, 269, 270, 271, 272, 274 and 275 of *Bacillus amyloliquefaciens* subtilisin; wherein when said protease variant includes a substitution of amino acid residues at positions corresponding to positions 103 and 76, there is also a substitution of an amino acid residue at one or more amino acid residue positions other than amino acid residue positions corresponding to positions 27, 99, 101, 104, 107, 109, 123, 128, 166, 204, 206, 210, 216, 217, 218, 222, 260, 265 or 274 of *Bacillus amyloliquefaciens* subtilisin; and one or more cleaning adjunct materials.

While any combination of the above listed amino acid substitutions may be employed, the preferred protease variant enzymes useful for the present invention comprise the substitution, deletion or insertion of amino acid residues in the following combinations:

(1) a protease variant including substitutions of the amino acid residues at position 103 and at one or more of the following positions 236 and 245;

(2) a protease variant including substitutions of the amino acid residues at positions 103 and 236 and at one or more of the following positions: 12, 61, 62, 68, 76, 97, 98, 101, 102, 104, 109, 130, 131, 159, 183, 185, 205, 209, 210, 211, 212, 213, 215, 217, 230, 232, 248, 252, 257, 260, 270 and 275;

(3) a protease variant including substitutions of the amino acid residues at positions 103 and 245 and at one or more of the following positions: 12, 61, 62, 68, 76, 97, 98, 101, 102, 104, 109, 130, 131, 159, 170, 183, 185, 205, 209, 210, 211, 212, 213, 215, 217, 222, 230, 232, 248, 252, 257, 260, 261, 270 and 275; and (4) a protease variant including substitutions of the amino acid residues at positions 103, 236 and 245 and at one or more of the following positions: 12, 61, 62, 68, 76, 97, 98, 101, 102, 104, 109, 130, 131, 159, 183, 185, 205, 209, 210, 211, 212, 213, 215, 217, 230, 232, 243, 248, 252, 257, 260, 270 and 275, as described in the patent applications of C. Ghosh, et al, entitled Cleaning Compositions Containing Multiply-Substituted Protease Variants" having U.S. Ser. No. 09/529,905, filed Oct. 23, 1998.

Amylases suitable herein, especially for, but not limited to automatic dishwashing purposes, include, for example, α-amylases described in GB 1,296,839 to Novo; RAPIDASE®, International Bio-Synthetics, Inc. and TERMAMYL®, Novo. FUNGAMYL® from Novo is especially useful. Engineering of enzymes for improved stability, e.g., oxidative stability, is known. See, for example J. Biological Chem., Vol. 260, No. 11, June 1985, pp 6518–6521. These alternative amylases herein share the characteristic of being "stability-enhanced" amylases, characterized, at a minimum, by a measurable improvement in one or more of: oxidative stability, e.g., to hydrogen peroxide/tetraacetylethylenediamine in buffered solution at pH 9–10; thermal stability, e.g., at common wash temperatures such as about 60° C.; or alkaline stability, e.g., at a pH from about 8 to about 11, measured versus the above-identified reference-point amylase. Stability can be measured using any of the art-disclosed technical tests. See, for example, references disclosed in WO 9402597. Stability-enhanced amylases can be obtained from Novo or from Genencor International. One class of alternative amylases herein have the commonality of being derived using site-directed mutagenesis from one or more of the Baccillus amylases, especialy the Bacillus α-amylases, regardless of whether one, two or multiple amylase strains are the immediate precursors. Oxidative stability-enhanced amylases vs. the above-identified reference amylase are alternative for use, especially in bleaching, alternatively oxygen bleaching, as distinct from chlorine bleaching, detergent compositions herein. Such alternative amylases include (a) an amylase according to the hereinbefore incorporated WO 9402597, Novo, Feb. 3, 1994, as further illustrated by a mutant in which substitution is made, using alanine or threonine, alternatively threonine, of the methionine residue located in position 197 of the B. licheniformis alpha-amylase, known as TERMAMYL®, or the homologous position variation of a similar parent amylase, such as B. amyloliquefaciens, B. subtilis, or B. stearothermophilus; (b) stability-enhanced amylases as described by Genencor International in a paper entitled "Oxidatively Resistant alpha-Amylases" presented at the 207th American Chemical Society National Meeting, Mar. 13–17, 1994, by C. Mitchinson. Methionine (Met) was identified as the most likely residue to be modified. Met was substituted, one at a time, in positions 8, 15, 197, 256, 304, 366 and 438 leading to specific mutants, particularly important being M197L and M197T with the M197T variant being the most stable expressed variant. Other alternative oxidative stability enhanced amylase include those described in WO 9418314 to Genencor International and WO 9402597 to Novo. Any other oxidative stability-enhanced amylase can be used, for example as derived by site-directed mutagenesis from known chimeric, hybrid or simple mutant parent forms of available amylases. Other alternative enzyme modifications are accessible. See WO 9509909 A to Novo.

Cellulases usable herein include both bacterial and fungal types, alternatively having a pH optimum between 5 and 9.5. U.S. Pat. No. 4,435,307, Barbesgoard et al, Mar. 6, 1984, discloses suitable fungal cellulases from Humicola insolens or Humicola strain DSM1800 or a cellulase 212-producing fungus belonging to the genus Aeromonas, and cellulase extracted from the hepatopancreas of a marine mollusk, Dolabella Auricula Solander. Suitable cellulases are also disclosed in GB-A-2.075.028; GB-A-2.095.275 and DE-OS-2.247.832. CAREZYME® (Novo) is especially useful. See also WO 9117243 to Novo.

Suitable lipase enzymes for detergent usage include those produced by microorganisms of the Pseudomonas group, such as Pseudomonas stutzeri ATCC 19.154, as disclosed in GB 1,372,034. See also lipases in Japanese Patent Application 53,20487, laid open Feb. 24, 1978. This lipase is available from Amano Pharmaceutical Co. Ltd., Nagoya, Japan, under the trade name Lipase P "Amano," or "Amano-P." Other suitable commercial lipases include Amano-CES, lipases ex Chromobacter viscosum, e.g. Chromobacter viscosum var. lipolyticum NRRLB 3673 from Toyo Jozo Co., Tagata, Japan; Chromobacter viscosum lipases from U.S. Biochemical Corp., U.S.A. and Disoynth Co., The Netherlands, and lipases ex Pseudomonas gladioli. LIPOLASE® enzyme derived from Humicola lanuginosa and commercially available from Novo, see also EP 341,947, is a alternative lipase for use herein. Lipase and amylase variants stabilized against peroxidase enzymes are described in WO 9414951 A to Novo. See also WO 9205249 and RD 94359044.

Cutinase enzymes suitable for use herein are described in WO 8809367 A to Genencor.

Peroxidase enzymes may be used in combination with oxygen sources, e.g., percarbonate, perborate, hydrogen peroxide, etc., for "solution bleaching" or prevention of transfer of dyes or pigments removed from substrates during the wash to other substrates present in the wash solution. Known peroxidases include horseradish peroxidase, ligninase, and haloperoxidases such as chloro- or bromo-peroxidase. Peroxidase-containing detergent compositions are disclosed in WO 89099813 A, Oct. 19, 1989 to Novo and WO 8909813 A to Novo.

A range of enzyme materials and means for their incorporation into synthetic detergent compositions is also disclosed in WO 9307263 A and WO 9307260 A to Genencor International, WO 8908694 A to Novo, and U.S. Pat. No. 3,553,139, Jan. 5, 1971 to McCarty et al. Enzymes are further disclosed in U.S. Pat. No. 4,101,457, Place et al, Jul. 18, 1978, and in U.S. Pat. No. 4,507,219, Hughes, Mar. 26, 1985. Enzyme materials useful for liquid detergent formulations, and their incorporation into such formulations, are disclosed in U.S. Pat. No. 4,261,868, Hora et al, Apr. 14, 1981. Enzymes for use in detergents can be stabilized by various techniques. Enzyme stabilization techniques are disclosed and exemplified in U.S. Pat. No. 3,600,319, Aug. 17, 1971, Gedge et al, EP 199,405 and EP 200,586, Oct. 29, 1986, Venegas. Enzyme stabilization systems are also described, for example, in U.S. Pat. No. 3,519,570. A useful Bacillus, sp. AC13 giving proteases, xylanases and cellulases, is described in WO 9401532 A to Novo.

Other Materials

Detersive ingredients or adjuncts optionally included in the instant compositions can include one or more materials for assisting or enhancing the performance of the treating compositions, treatment of the substrate to be cleaned, or designed to improve the aesthetics of the compositions. Adjuncts which can also be included in compositions of the present invention, at their conventional art-established levels for use (generally, adjunct materials comprise, in total, from about 30% to about 99.9%, alternatively from about 70% to about 95%, by weight of the compositions), include other active ingredients such as photoactive inorganic metal oxides, color speckles, anti-tarnish agents, anti-corrosion agents, alkalinity sources, hydrotropes, anti-oxidants, organic solvents, surfactants, polymers, builders, bleaches, bleach activators, bleach catalysts, non-activated enzymes, enzyme stabilizing systems, chelants, optical brighteners, soil release polymers, wetting agents, dye transfer agents, dispersants, suds suppressors, dyes, perfumes, colorants, filler salts, photoactivators, fluorescers, conditioners, hydrolyzable cosurfactants, perservatives, anti-shrinkage agents, germicides, fungicides, silvercare, solubilizing agents, carriers, processing aids, pigments, and pH control agents as described in U.S. Pat. Nos. 5,705,464; 5,710,115; 5,698,504; 5,695,679; 5,686,014; 5,576,282 and 5,646,101.

II. Methods of Use

The coating composition, which contains a nanoparticle system with an effective amount of non-photoactive nanoparticles in and aqueous suitable carrier medium, and optionally a surfactant, one or more charged functionalized surface molecules, an effective amount of photoactive nanoparticles, and optionally, e.g., adjunct organic solvents, surfactants, polymers, chelants, builders, bleaches, bleach activators, bleach catalysts, non-activated enzymes, enzyme stabilizing systems, optical brighteners, soil release polymers, wetting agents, dye transfer agents, dispersants, suds suppressors, dyes, perfumes, colorants, filler salts, hydrotropes, photoactivators, fluorescers, conditioners, hydrolyzable cosurfactants, preservatives, anti-oxidants, anti-shrinkage agents, germicides, fungicides, color speckles, silvercare, anti-tarnish and/or anti-corrosion agents, alkalinity sources, solubilizing agents, carriers, processing aids, pigments, and pH control agents, etc. and mixtures thereof, can be used by (a) mixing said nanoparticles in suitable carrier medium to form said coating composition; (b) optionally mixing said nanoparticles dispersed in suitable carrier medium with adjunct ingredients to form said coating composition; (c) optionally mixing said nanoparticles dispersed in suitable carrier medium with surfactant to form said coating composition; (d) optionally mixing said nanoparticles dispersed in suitable carrier medium with adjunct ingredients and surfactant to form said coating composition; (e) applying said coating composition to said hard surface; (f) allowing said coating composition to dry, or actively drying the coating composition, or otherwise curing the coating composition; and (g) optionally repeating any of steps (a) through (f) as needed.

Distribution of the coating composition can be achieved by using a spray device, an immersion container, a spray hose attachment, or an applicator, such as a fabric, sponge, roller, a pad, etc., alternatively a spray dispenser. The coating compositions and articles of the present invention which contain the nanoparticle system can be used to treat all hard surfaces to provide at least one of the following improved durable benefits: improved hard surface wetting and sheeting, quick drying, uniform drying, soil removal, self-cleaning, anti-spotting, anti-soil deposition, cleaner appearance, enhanced gloss, enhanced color, minor surface defect repair, improved smoothness, anti-hazing properties, modification of surface friction, release of actives, reduced damage to abrasion and improved transparency.

In one aspect of the present invention, an effective amount of the liquid coating composition of the present invention is alternatively sprayed onto hard surfaces and/or hard surface articles include, but are not limited to: interior and exterior glass windows, walls and doors; exterior vehicle bodies, including but not limited to auto bodies, trucks, trains, boats and planes; ceramic tile, floors and walls; bathroom and kitchen countertops; appliances; metal fixtures, siding and roofing; dishware; wood furniture, flooring and wall treatments; stone tiles and walls; asphalt roofing, siding and driveways; jewelry; exterior building surfaces; painted and coated surfaces, etc. When the coating composition is sprayed onto a hard surface, an effective amount of the nanoparticle system should be deposited onto the hard surface, with the hard surface becoming damp or totally saturated with the coating composition. The hard surface coating composition can also be applied to a hard surface via roll coating, curtain coating, a dipping and/or soaking process in an immersion container. Any of the application steps can be followed by a drying, or curing step.

In one non-limiting aspect of the present invention, the coating composition is used to apply a durable coating on the surface of a vehicle, such as an automobile. The steps in applying the coating composition can involve one or more of the following steps, in addition to a step of applying the coating composition: a pre-wash step; a washing step, such as with soap and a sponge to produce lather; a rinse step; an activated rinse step; a step for applying the coating composition described herein; and a drying step. These steps can be performed by consumers at home, such as if they are provided with the components needed to carry out the steps in the form of a kit, such as a car care kit. Instructions can be provided. Alternatively, the steps can be performed in a commercial operation, such as at a car wash, which may be of the automatic type, or the "self serve" type where customers use a wash bay to spray their car clean.

The hard surface coating composition can be applied to the hard surface at any suitable air temperature. It has been found that the hard surface coating composition can be applied at any temperature above freezing. For instance, the coating composition can be applied at temperatures as low as 1°, 5°, 10°, or 15° C.

The hard surface can then be subjected to conditions so as to cure or dry the coating composition. The drying step can comprise air drying in ambient conditions. Alternatively, the drying step can comprise actively drying or curing the coating composition by utilizing any technology known for accelerating a drying or curing process. The term "actively curing", as used herein, refers to any technique used to accelerate the curing process beyond merely allowing the coating composition to dry under ambient conditions. For instance, known cross-linking agents can be incorporated into the composition to cure the same. Although various methods of curing may be used, thermal or heat curing, or heat drying is preferred. The hard surface coating composition can be heat dried at any air temperature which is above the ambient temperature (which air temperature of drying may, for example, be greater than or equal to about any five degree increment above 0° C.). Generally, heat curing is effected by exposing the coated surface to elevated temperatures, such as those provided by radiative heat sources. Such technology may include moving (or forced)

air drying such as drying by fans, blow drying, etc., or the application of heat (such as by radiative heat sources, such as drying in ovens, etc.), or both moving or forced air drying and the application of heat (such as heated blow drying).

It has been found that heat drying the hard surface coating composition can greatly increase the durability of the hard surface coating. The amount of increase in the durability of the hard surface coating composition can, in fact, be quite unexpectedly high.

For instance, in some embodiments, it has been found that when the hard surface coating composition is applied to a hard surface and air dried at ambient temperature, the hard surface coating is able to provide the benefits described herein (or at least some of such benefits) after it has been subjected to one or two routines/cycles of the mechanical Scrub method described in the Test Methods section below. This is believed to translate into about two to four weeks of surface protection and modification in an outside environment, including washing the surface about once a week.

However, if the hard surface coating composition is heat dried above ambient temperature (which may be about 20–22° C. in the case of a moderate outside temperature, or interior air temperature in a building), the hard surface coating formed on the surface has been found to have increased durability, so that it provides more lasting benefits. The term "long lasting", as used herein, refers to a coating that is able to provide at least some of the benefits described herein after more than one cycle of the Scrub Method described in the Test Methods section. The hard surface coating composition can be heat dried at any air temperature of greater than or equal to about 50° C. and any five degree increment above 50° C. (e.g., 80° C.) to provide long lasting benefits. However, this could be influenced by accelerants, i.e., solvents and crosslinking agents. The hard surface coating composition can be air dried at temperatures that approach, but preferably do not exceed a temperature that would cause the hard surface being coated to be altered, such as by melting, buckling, or the like. In one non-limiting embodiment, the hard surface coating composition can be applied to an automobile body panel, and then heat dried at an air temperature of about 145° C. to about 160° C., or any five degree increment therebetween. It has been found that a coating dried with such a heat drying process can withstand 500 or more cycles of the mechanical scrubbing test. In another non-limiting embodiment, the hard surface coating composition can be applied to an automobile body panel, and then heat dried at an air temperature of about 135° C. It has been found that a coating dried with such a heat drying process can withstand 50 or more cycles of the mechanical scrubbing test.

In another non-limiting embodiment, the hard surface coating composition can be applied to automobile glass, and then heat dried at an air temperature of about 135° C. It has been found that a coating dried with such a heat drying process can withstand 50 or more cycles of the mechanical scrubbing test.

The dried hard surface coating is preferably substantially hydrophilic. The dried hard surface, in some embodiments may have a contact angle with water of: less than or equal to about 60; or alternatively, less than or equal to about any increment of five less than 60 (e.g., less than or equal to about 50, 45, 40, . . . , 20, . . . , 10, etc.). In some embodiments, higher temperatures of application or drying result in higher initial contact angles, and lower temperatures of application or drying result in lower initial contact angles. However, the contact angle can change over the duration of the coating. The visual appearance of the dried hard surface coating, in some embodiments, can be improved after the surface is hydrated for 500 seconds. The visual improvement is characterized as improved sheeting or improved curtaining of water on the surface coating.

The application of the hard surface coating composition can be performed by large-scale processes on hard surfaces and/or finished articles in an industrial application, or in the consumer's home by the use of an article of manufacture.

Figure 4:
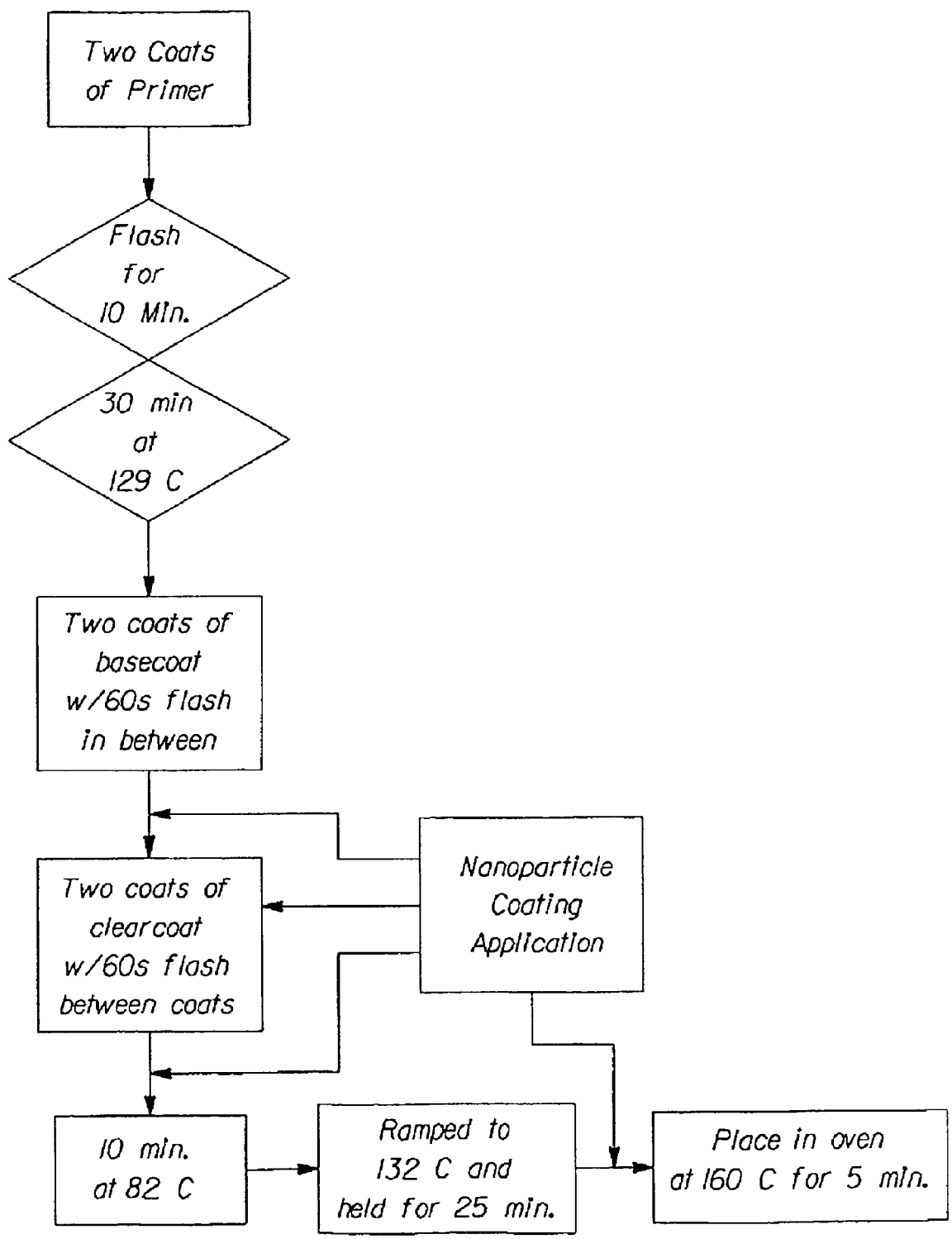
FIG. 4 is a flow diagram showing the steps in one embodiment of a clear coat application process for use in the automotive industry.

In one aspect, the method of the present invention can be used in an automobile manufacturing and/or painting operation to provide a durable finish on the exterior of an automobile. FIG. 4 is a flow chart which shows one non-limiting example of the steps in painting and applying a clear coat finish to the exterior body panels of an automobile. One clear coat composition comprises a polyurethane produced from polymerization of carbamate and melamin composition, such as that available under the tradename URECLEAR® from BASF, Southfield, Mich., USA.

In the example shown in FIG. 4, the first step in painting the automobile body panels is the application of two coats of primer without flash time (elapsed time for organic solvent evaporation) between coats. Following this, the primer is flashed (dried at lower temperatures at first to drive off much of the solvent(s), then heated to a higher temperature to cure the same; this prevents bubbling) for 10 minutes. The panels are then baked at 129° C. for 30 minutes. After this, two coats of basecoat (paint) are applied with a 60 second flash in between coats. Then, two coats of clear coat are applied with a 60 second flash in between coats. The panels are then heated for 10 minutes at 82° C. This heating process is ramped up to 132° C., and held at that temperature for 25 minutes. The final step is to place the panels in an oven at 160° C. for five minutes. Of course, in other processes the temperatures and times can be varied in any suitable manner. For example, a process used by ACT Laboratories, Inc. (Hillsdale, Mich., USA) that is used in the automotive industry to test automobile body panels is described in the Test Methods section.

As shown in FIG. 4, the hard surface coating composition described herein can be applied at many different steps in the process of applying the clear coat finish to the automobile body panels. The hard surface coating composition described herein can be applied after said one or more coats of paint are applied to said automobile body parts; during the step of applying one or more coats of clear coat to said automobile body parts; or, after said one or more coats of clear coat are applied to said automobile body parts.

In other embodiments, it may be desired to use nanoparticles in the form of a powder. The nanoparticles can be used alone, or they can be combined with some other substance to form a composition. The clear coat composition, in such embodiments can be provided in any suitable form, including, but not limited to liquids, and powders. In embodiments in which it is desired to use a powder hard surface coating comprising nanoclay with a powder clear coat, it may be desirable to modify the application procedure. The application procedure can be modified in many different ways. In any embodiments desired, the surface onto which the powder coating is to be deposited can also be charged to facilitate attraction and adherence of the nanoparticles thereto.

For instance, the clear coat powder composition can first be applied by electrostatic deposition techniques or fluidized bed techniques or other such techniques that are commonly practiced, followed by application of the nanoclay coating composition by electrostatic deposition or fluidized bed or other such techniques that are commonly practiced. The surface can then be heated to provide adequate curing.

In another embodiment, the clear coat powder composition can first be coated with the powdered hard surface coating comprising nanoclay. This can be followed by application of the clear coat powder composition coated with the powder hard surface coating comprising nanoclay to the desired surface by electrostatic deposition techniques or fluidized bed techniques or other such techniques that are commonly practiced. The surface can then be heated to provide adequate curing.

In another embodiments, the clear coat powder composition and the powder hard surface coating comprising nanoclay can be applied simultaneously to the desired surface by electrostatic deposition techniques or fluidized bed techniques or other such techniques that are commonly practiced. The surface can then be heated to provide adequate curing.

In other embodiments, such as in the auto body repair business, where in some cases it is not possible to heat the body panels to the temperatures described in the preceding paragraphs without damaging other portions of the automobile, the hard surface coating composition can be applied at much lower temperatures, such as temperatures above 60° C. (the temperature the surface of a car can reach on a hot day). In such embodiments, accelerants can be used, if desired.

In embodiments in which it is desired to use an aqueous hard surface coating composition comprising nanoclay with an organic clearcoat, it may be desirable to modify the application procedure. For instance, the clearcoat composition could first be applied, and then a "skim" or film could be formed on the top of the wet clear coat using techniques known to those of skill in the art (clearcoat compositions generally dry from the top portion thereof to the bottom, and become slightly tacky when drying). The hard surface coating composition could be placed on top of the skim, and then the clearcoat with the hard surface coating composition thereon could be heated together.

In any of the embodiments described in this specification, multiple layers of the hard surface coating composition can be applied to any of the hard surfaces described herein. These multiple layers of hard surface coating composition can all have the same chemical composition, or they can have different chemical compositions.

In addition to applying the hard surface coating composition described herein to automotive body panels, the hard surface coating composition can be applied to glass, plastic, or rubber. The hard surface coating composition can, for example, be applied to automotive window glass. The hard surface coating composition can be applied to automotive window glass at any stage in the manufacture of the window glass, or in the manufacture of the automobile.

In other embodiments, the method of applying the hard surface coating composition described herein can be applied to the components of aircraft, water craft, buildings, etc. to provide a more durable surface coating.

The present invention also comprises a method of using concentrated liquid or solid coating compositions, which are diluted to form compositions with the usage concentrations, as given hereinabove, for use in the "usage conditions". Concentrated compositions comprise a higher level of nanoparticle concentration, typically from about 0.1% to about 50%, alternatively from about 0.5% to about 40%, alternatively from about 1% to about 30%, by weight of the concentrated coating composition.

Concentrated compositions are used in order to provide a less expensive product. The concentrated product is alternatively diluted with 1,000 parts suitable carrier medium, alternatively 100 parts suitable carrier medium, and alternatively 10 parts suitable carrier medium of the coating composition.

In another embodiment of the present invention there is a provided a method of using a liquid, coating composition comprising (a) an effective amount of non-photoactive nanoparticles; (b) optionally a surfactant; (c) optionally having associated to said nanoparticle surface a quantity of one or more functionalized surface molecules exhibiting properties selected from the group consisting of hydrophilic, hydrophobic and mixtures thereof; (d) optionally an effective amount of photoactive nanoparticles; (e) optionally one or more adjunct ingredients; and (f) a suitable carrier medium, alternatively concentrated liquid, for treating dishware in the rinse step of an automatic dishwashing machine. The rinse water should contain typically from about 0.0005% to about 1%, alternatively from about 0.0008% to about 0.1%, alternatively from about 0.001% to about 0.02% of the nanoparticle.

Another alternative method comprises the treatment of dishware with a coating composition dispensed from a sprayer at the beginning and/or during the drying cycle. It is preferable that the treatment is performed in accordance with the instructions for use, to ensure that the consumer knows what benefits can be achieved, and how best to obtain these benefits.

Another alternative method comprises stripping at least one layer of nanopaticles from the transparent coating on a treated hard surface using mechanical or chemical means to remove the layer of foreign matter (i.e. soil, spotting residues, food etc.) in accordance with the instructions for use to impart the benefits desired, wherein mechanical or chemical means does not exclude the weathering or optionally the normal use of the surface. Not to be limited by theory, the strippable-film mechanism of this method is depicted in FIGS. 1–3.

Figure 2:
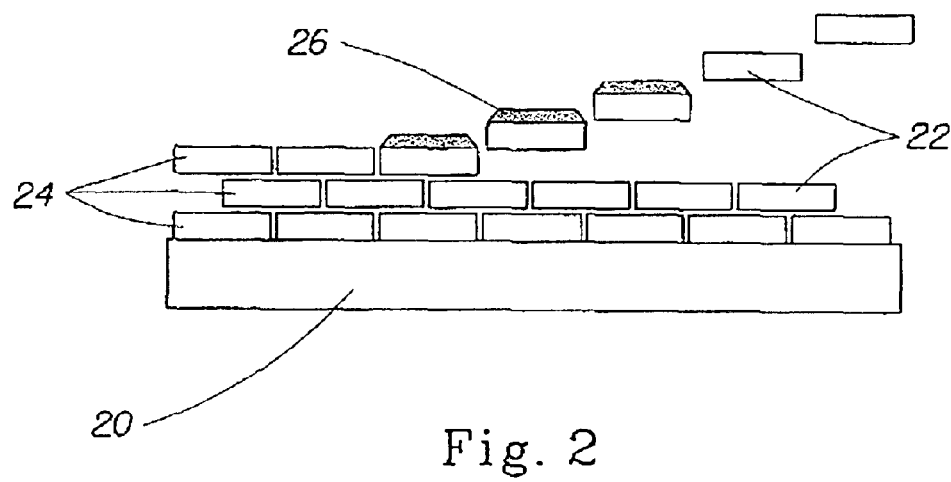
FIG. 2 is a schematic side view similar to FIG. 1, only showing how the removal of the top layer of nanoparticles may remove the soil deposited on the coating.
Figure 3:
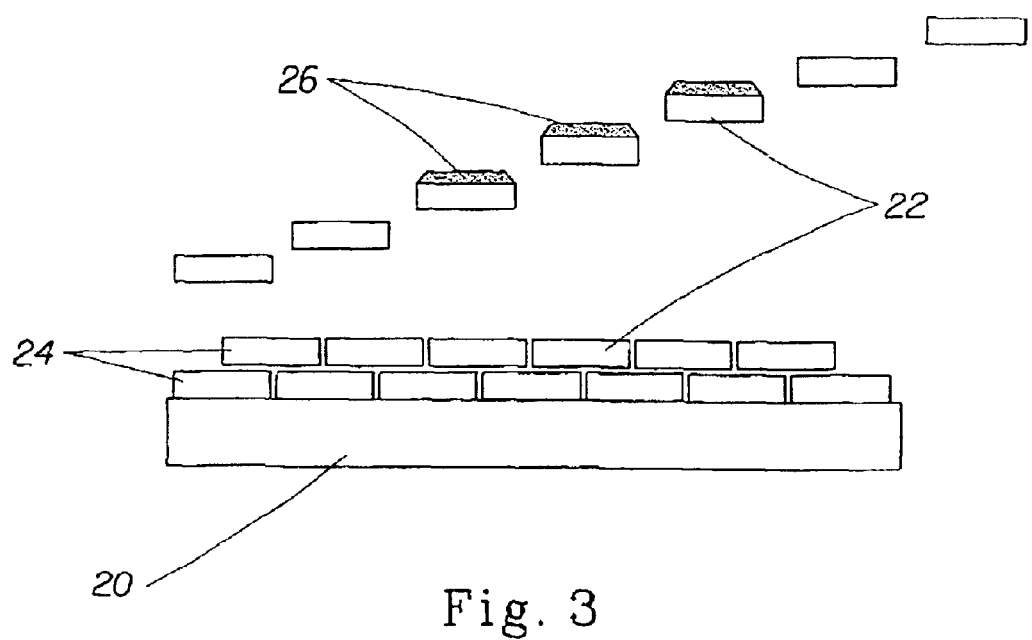
FIG. 3 is a schematic side view similar to FIGS. 1 and 2 showing a further step in the removal process.

In FIGS. 1–3, the hard surface is designated by reference number 20. The individual nanoparticles are designated by reference number 22, and the layers formed thereby are designated by reference number 24. The soil deposited on the nanoparticles is designated by reference number 26. In one embodiment of the present invention, such as an automotive, exterior building or dishware surface application, an effective nanoparticle coating is deposited as an invisible film, preventing soil 26 from adhering to the hard surface 20 (FIG. 1). The nanoparticle coating consists of multiple effective layers 24 of nanoparticle sheets that provide the benefit. During the weathering, washing or stripping treatment process, at least one top layer 24 of the nanoparticle coating is removed, taking the soil 26 along with it (FIGS. 2 and 3).

III. Articles of Manufacture

The present invention also relates to an article of manufacture comprising the hard surface coating composition in a package, in association with instructions for how to use the coating composition to treat hard surfaces correctly, in order to obtain the desirable results, viz, improved multi-use benefits consisting of improved hard surface wetting and sheeting, quick drying, uniform drying, soil removal, self-cleaning, anti-spotting, anti-soil deposition, cleaner appearance, enhanced gloss, enhanced color, minor surface defect repair, improved smoothness, anti-hazing properties, modification of surface friction, release of actives, reduced damage to abrasion, improved transparency and mixtures thereof. An alternative article of manufacture comprises said composition in a spray dispenser, in association with instructions for how to use the coating composition to treat hard surfaces correctly, including, e.g., the manner and/or amount of composition to spray, and the alternative ways of applying the coating composition, as will be described with more detailed herein below. It is important that the instructions be as simple and clear as possible, so that using pictures and/or icons is desirable.

Spray Dispenser

An article of manufacture herein comprises a spray dispenser. The coating composition is placed into a spray dispenser in order to be distributed onto the hard surface. Said spray dispenser for producing a spray of liquid droplets can be any of the manually activated means as is known in the art, e.g. trigger-type, pump-type, non-aerosol self-pressurized, and aerosol-type spray means, for treating the coating composition to small hard surface areas and/or a small number of substrates, as well as non-manually operated, powered sprayers for conveniently treating the coating composition to large hard surface areas and/or a large number of substrates. The spray dispenser herein does not normally include those that will substantially form the clear, aqueous coating composition. It has been found that providing smaller particle droplets increases the performance. Desirably, the Sauter mean particle diameter is from about 10 $\mu$m to about 120 $\mu$m, alternatively, from about 20 $\mu$m to about 100 $\mu$m. Coating benefits for example are improved by providing small particles (droplets), especially when the surfactant is present.

The spray dispenser can be an aerosol dispenser. Said aerosol dispenser comprises a container which can be constructed of any of the conventional materials employed in fabricating aerosol containers. The dispenser must be capable of withstanding internal pressure in the range of from about 20 to about 10 p.s.i.g., alternatively from about 20 to about 70 p.s.i.g. The one important requirement concerning the dispenser is that it be provided with a valve member which will permit the clear, aqueous coating composition contained in the dispenser to be dispensed in the form of a spray of very fine, or finely divided, particles or droplets. The aerosol dispenser utilizes a pressurized sealed container from which the clear, aqueous coating composition is dispensed through a special actuator/valve assembly under pressure. Incorporating therein a gaseous component generally known as a propellant pressurizes the aerosol dispenser. Common aerosol propellants, e.g., gaseous hydrocarbons such as isobutane, and mixed halogenated hydrocarbons, can be used. Halogenated hydrocarbon propellants such as chlorofluoro hydrocarbons have been alleged to contribute to problems, and are not alternatives. When cyclodextrin is present hydrocarbon propellants are not alternatives, because they can form complexes with the cyclodextrin molecules thereby reducing the availability of uncomplexed cyclodextrin molecules for odor absorption. Alternative propellants are compressed air, nitrogen, inert gases, carbon dioxide, etc. A more complete description of commercially available aerosol-spray dispensers appears in U.S. Pat. Nos.: U.S. Pat. No. 3,436,772, Stebbins, issued Apr. 8, 1969; and U.S. Pat. No. 3,600,325, Kaufman et al., issued Aug. 17, 1971; both of said references are incorporated by reference.

Alternatively the spray dispenser can be a self-pressurized non-aerosol container having a convoluted liner and an elastomeric sleeve. Said self-pressurized dispenser comprises a liner/sleeve assembly containing a thin, flexible radially expandable convoluted plastic liner of from about 0.010 to about 0.020 inch thick, inside an essentially cylindrical elastomeric sleeve. The liner/sleeve is capable of holding a substantial quantity of coating composition and of causing said composition to be dispensed. A more complete description of self-pressurized spray dispensers can be found in U.S. Pat. No. 5,111,971, Winer, issued May 12, 1992, and U.S. Pat. No. 5,232,126, Winer, issued Aug. 3, 1993; both of said references are herein incorporated by reference. Another type of aerosol spray dispenser is one wherein a barrier separates the coating composition from the propellant (alternatively compressed air or nitrogen), as disclosed in U.S. Pat. No. 4,260,110, issued Apr. 7, 1981, and incorporated herein by reference. Such a dispenser is available from EP Spray Systems, East Hanover, N.J.

Alternatively, the spray dispenser is a non-aerosol, manually activated, pump-spray dispenser. Said pump-spray dispenser comprises a container and a pump mechanism which securely screws or snaps onto the container. The container comprises a vessel for containing the aqueous coating composition to be dispensed.

The pump mechanism comprises a pump chamber of substantially fixed volume, having an opening at the inner end thereof. Within the pump chamber is located a pump stem having a piston on the end thereof disposed for reciprocal motion in the pump chamber. The pump stem has a passageway there through with a dispensing outlet at the outer end of the passageway and an axial inlet port located inwardly thereof.

The container and the pump mechanism can be constructed of any conventional material employed in fabricating pump-spray dispensers, including, but not limited to: polyethylene; polypropylene; polyethyleneterephthalate; blends of polyethylene, vinyl acetate, and rubber elastomer. An alternative container is made of clear, e.g., polyethylene terephthalate. Other materials can include stainless steel. A more complete disclosure of commercially available dispensing devices appears in: U.S. Pat. Nos.: U.S. Pat. No. 4,895,279, Schultz, issued Jan. 23, 1990; U.S. Pat. No. 4,735,347, Schultz et al., issued Apr. 5, 1988; and U.S. Pat. No. 4,274,560, Carter, issued Jun. 23, 1981; all of said references are herein incorporated by reference.

Alternatively, the spray dispenser is a manually activated trigger-spray dispenser. Said trigger-spray dispenser comprises a container and a trigger both of which can be constructed of any of the conventional material employed in fabricating trigger-spray dispensers, including, but not limited to: polyethylene; polypropylene; polyacetal; polycarbonate; polyethyleneterephthalate; polyvinyl chloride; polystyrene; blends of polyethylene, vinyl acetate, and rubber elastomer. Other materials can include stainless steel and glass. An alternative container is made of clear, e.g. polyethylene terephthalate. The trigger-spray dispenser does not incorporate a propellant gas into the odor-absorbing composition, and alternatively it does not include those that will form the coating composition. The trigger-spray dispenser herein is typically one which acts upon a discrete amount of the coating composition itself, typically by means of a piston or a collapsing bellows that displaces the coating composition through a nozzle to create a spray of thin liquid. Said trigger-spray dispenser typically comprises a pump chamber having either a piston or bellows which is movable through a limited stroke response to the trigger for varying the volume of said pump chamber. This pump chamber or bellows chamber collects and holds the product for dispensing. The trigger spray dispenser typically has an outlet check valve for blocking communication and flow of fluid through the nozzle and is responsive to the pressure inside the chamber. For the piston type trigger sprayers, as the trigger is compressed, it acts on the fluid in the chamber and the spring, increasing the pressure on the fluid. For the bellows spray dispenser, as the bellows is compressed, the pressure increases on the fluid. The increase in fluid pressure in either type of trigger spray dispenser acts to open the top outlet check valve. The top valve allows the product to be forced through the swirl chamber and out the nozzle to form a discharge pattern. An adjustable nozzle cap can be used to vary the pattern of the fluid dispensed.

For the piston spray dispenser, as the trigger is released, the spring acts on the piston to return it to its original position. For the bellows spray dispenser, the bellows acts as the spring to return to its original position. This action causes a vacuum in the chamber. The responding fluid acts to close the outlet valve while opening the inlet valve drawing product up to the chamber from the reservoir.

A more complete disclosure of commercially available dispensing devices appears in U.S. Pat. No. 4,082,223, Nozawa, issued Apr. 4, 1978; U.S. Pat. No. 4,161,288, McKinney, issued Jul. 17, 1985; U.S. Pat. No. 4,434,917, Saito et al., issued Mar. 6, 1984; and U.S. Pat. No. 4,819,835, Tasaki, issued Apr. 11, 1989; 5,303,867, Peterson, issued Apr. 19, 1994; all of said references are incorporated herein by reference.

A broad array of trigger sprayers or finger pump sprayers is suitable for use with the coating compositions of this invention. These are readily available from suppliers such as Calmar, Inc., City of Industry, Calif.; CSI (Continental Sprayers, Inc.), St. Peters, Mo.; Berry Plastics Corp., Evansville, Ind., a distributor of Guala® sprayers; or Seaquest Dispensing, Cary, Ill.

Nonlimiting examples of trigger sprayers are the blue inserted Guala® sprayer, available from Berry Plastics Corp., or the Calmar TS800–1A®, TS1300®, and TS-800–2®, available from Calmar Inc., because of the fine uniform spray characteristics, spray volume, and pattern size. Alternatives include sprayers with precompression features and finer spray characteristics and even distribution, such as Yoshino sprayers from Japan. Any suitable bottle or container can be used with the trigger sprayer, an alternative bottle is a 17 fl-oz. bottle (about 500 ml) of good ergonomics similar in shape to the Cinch® bottle. It can be made of any materials such as high-density polyethylene, polypropylene, polyvinyl chloride, polystyrene, polyethylene terephthalate, glass, or any other material that forms bottles. Alternatively, it is made of high-density polyethylene or clear polyethylene terephthalate.

For smaller fluid ounce sizes (such as 1 to 8 ounces), a finger pump can be used with canister or cylindrical bottle. The alternative pump for this application is the cylindrical Euromist II® from Seaquest Dispensing.

The article of manufacture herein can also comprise a non-manually operated spray dispenser. By "non-manually operated" it is meant that the spray dispenser can be manually activated, but the force required to dispense the coating composition is provided by another, non-manual means. Non-manually operated sprayers include, but are not limited to, powered sprayers, air aspirated sprayers, liquid aspirated sprayers, electrostatic sprayers, and nebulizer sprayers. The coating composition is placed into a spray dispenser in order to be distributed onto the hard surface.

Powered sprayers include self-contained powered pumps that pressurize the aqueous coating composition and dispense it through a nozzle to produce a spray of liquid droplets. Powered sprayers are attached directly or remotely through the use of piping/tubing to a reservoir (such as a bottle) to hold the aqueous coating composition. Powered sprayers can include, but are not limited to, centrifugal or positive displacement designs. It is preferred that the powered sprayer be powered by a portable DC electrical current from either disposable batteries (such as commercially available alkaline batteries) or rechargeable battery units (such as commercially available nickel cadmium battery units). Powered sprayers can also be powered by standard AC power supply available in most buildings. The discharge nozzle design can be varied to create specific spray characteristics (such as spray diameter and particle size). It is also possible to have multiple spray nozzles for different spray characteristics. The nozzle may or may not contain an adjustable nozzle shroud that would allow the spray characteristics to be altered.

Nonlimiting examples of commercially available powered sprayers are disclosed in U.S. Pat. No. 4,865,255, Luvisotto, issued Sep. 12, 1989 which is incorporated herein by reference. Alternative powered sprayers are readily available from suppliers such as Solo, Newport News, Va. (e.g., Solo Spraystar™ rechargeable sprayer, listed as manual part #: U.S. Pat. No. 460,395) and Multi-sprayer Systems, Minneapolis, Minn. (e.g., model: Spray 1).

Air aspirated sprayers include the classification of sprayers generically known as "air brushes". A stream of pressurized air draws up the aqueous coating composition and dispenses it through a nozzle to create a spray of liquid. The coating composition can be supplied via separate piping/tubing or more commonly is contained in a jar to which the aspirating sprayer is attached.

Nonlimiting examples of commercially available air aspirated sprayers appears in U.S. Pat. No. 1,536,352, Murray, issued Apr. 22, 1924 and U.S. Pat. No. 4,221,339, Yoshikawa, issues Sep. 9, 1980; all of said references are incorporated herein by reference. Air aspirated sprayers are readily available from suppliers such as The Badger Air-Brush Co., Franklin Park, Ill. (e.g., model #: 155) and Wilton Air Brush Equipment, Woodridge, Ill. (e.g., stock #: 415-4000, 415-4001, 415-4100).

Liquid aspirated sprayers are typical of the variety in widespread use to spray garden chemicals. The aqueous coating composition is drawn into a fluid stream by means of suction created by a Venturi effect. The high turbulence serves to mix the aqueous coating composition with the fluid stream (typically water) in order to provide a uniform mixture/concentration. It is possible with this method of delivery to dispense the aqueous concentrated coating composition of the present invention and then dilute it to a selected concentration with the delivery stream.

Liquid aspirated sprayers are readily available from suppliers such as Chapin Manufacturing Works, Batavia, N.Y. (e.g., model #: 6006).

Electrostatic sprayers impart energy to the aqueous coating composition via a high electrical potential. This energy serves to atomize and charge the aqueous coating composition, creating a spray of fine, charged particles. As the charged particles are carried away from the sprayer, their common charge causes them to repel one another. This has two effects before the spray reaches the target. First, it expands the total spray mist. This is especially important when spraying to fairly distant, large areas. The second effect is maintenance of original particle size. Because the particles repel one another, they resist collecting together into large, heavier particles like uncharged particles do. This lessens gravity's influence, and increases the charged particle reaching the target. As the mass of negatively charged particles approach the target, they push electrons inside the target inwardly, leaving all the exposed surfaces of the target with a temporary positive charge. The resulting attraction between the particles and the target overrides the influences of gravity and inertia. As each particle deposits on the target, that spot on the target becomes neutralized and no longer attractive. Therefore, the next free particle is attracted to the spot immediately adjacent and the sequence continues until the entire surface of the target is covered. Hence, charged particles improve distribution and reduce drippage.

Nonlimiting examples of commercially available electrostatic sprayers appears in U.S. Pat. No. 5,222,664, Noakes, issued Jun. 29, 1993; U.S. Pat. No. 4,962,885, Coffee, issued Oct. 16, 1990; U.S. Pat. No. 2,695,002, Miller, issued November 1954; U.S. Pat. No. 5,405,090, Greene, issued Apr. 11, 1995; U.S. Pat. No. 4,752,034, Kuhn, issued Jun. 21, 1988; U.S. Pat. No. 2,989,241, Badger, issued June 1961; all of said patents are incorporated herein by reference. Electrostatic sprayers are readily available from suppliers such as Tae In Tech Co, South Korea and Spectrum, Houston, Tex.

Nebulizer sprayers impart energy to the aqueous coating composition via ultrasonic energy supplied via a transducer. This energy results in the aqueous coating composition to be atomized. Various types of nebulizers include, but are not limited to, heated, ultrasonic, gas, venturi, and refillable nebulizers.

Nonlimiting examples of commercially available nebulizer sprayers appears in U.S. Pat. No. 3,901,443, Mitsui, issued Aug. 26, 1975; U.S. Pat. No. 2,847,248, Schmitt, issued August 1958; U.S. Pat. No. 5,511,726, Greenspan, issued Apr. 30, 1996; all of said patents are incorporated herein by reference. Nebulizer sprayers are readily available from suppliers such as A&D Engineering, Inc., Milpitas, Calif. (e.g., model A&D Un-231 ultrasonic handy nebulizer) and Amici, Inc., Spring City, Pa. (model: swirler nebulizer).

The alternative article of manufacture herein comprises a non-manually operated sprayer, such as a battery-powered sprayer, containing the aqueous coating composition. Alternatively the article of manufacture comprises a combination of a non-manually operated sprayer and a separate container of the aqueous coating composition, to be added to the sprayer before use and/or to be separated for filling/refilling. The separate container can contain a usage composition, or a concentrated composition to be diluted before use, and/or to be used with a diluting sprayer, such as with a liquid aspirated sprayer, as described herein above.

Also, as described hereinbefore, the separate container should have structure that mates with the rest of the sprayer to ensure a solid fit without leakage, even after motion, impact, etc. and when handled by inexperienced consumers. The sprayer desirably can also have an attachment system that is safe and alternatively designed to allow for the liquid container to be replaced by another container that is filled. For example, a filled container can replace the fluid reservoir. This can minimize problems with filling, including minimizing leakage, if the proper mating and sealing means are present on both the sprayer and the container. Desirably, the sprayer can contain a shroud to ensure proper alignment and/or to permit the use of thinner walls on the replacement container. This minimizes the amount of material to be recycled and/or discarded. The package sealing or mating system can be a threaded closure (sprayer) which replaces the existing closure on the filled and threaded container. A gasket is desirably added to provide additional seal security and minimize leakage. The gasket can be broken by action of the sprayer closure. These threaded sealing systems can be based on industry standards. However, it is highly desirable to use a threaded sealing system that has non-standard dimensions to ensure that the proper sprayer/bottle combination is always used. This helps prevent the use of fluids that are toxic, which could then be dispensed when the sprayer is used for its intended purpose.

An alternative sealing system can be based on one or more interlocking lugs and channels. Such systems are commonly referred to as "bayonet" systems. Such systems can be made in a variety of configurations, thus better ensuring that the proper replacement fluid is used. For convenience, the locking system can also be one that enables the provision of a "child-proof" cap on the refill bottle. This "lock-and-key" type of system thus provides highly desirable safety features. There are a variety of ways to design such lock and key sealing systems.

Care must be taken, however, to prevent the system from making the filling and sealing operation too difficult. If desired, the lock and key can be integral to the sealing mechanism. However, for the purpose of ensuring that the correct recharge or refill is used, the interlocking pieces can be separate from the sealing system. E.g., the shroud and the container could be designed for compatibility. In this way, the unique design of the container alone could provide the requisite assurance that the proper recharge/refill is used.

Examples of threaded closures and bayonet systems can be found in U.S. Pat. No. 4,781,311, Nov. 1, 1988 (Angular Positioned Trigger Sprayer with Selective Snap-Screw Container Connection, Clorox), U.S. Pat. No. 5,560,505, Oct. 1, 1996 (Container and Stopper Assembly Locked Together by Relative Rotation and Use Thereof, Cebal SA), and U.S. Pat. No. 5,725,132, Mar. 10, 1998 (Dispenser with Snap-Fit Container Connection, Centico International). All of said patents are incorporated herein by reference.

The present invention also relates to an article of manufacture comprising a coating composition for use in spraying and/or misting an entire hard surface or article in a manner such that excessive amounts of the coating composition are prevented from being released to the open environment, provided in association with instructions for use to ensure that the consumer applies at least an effective amount of nanoparticle system and/or coating composition, to provide the desired hard surface multi-use benefit.

Other coating compositions of the present invention for use to treat hard surfaces, such as dishware, in different steps of the automatic dishwashing process, e.g., pre-wash, wash cycle, rinse cycle, and drying cycle, can be packaged in association with instructions for how to use the coating composition to treat dishware correctly, in order to obtain the desirable hard surface coating results, viz. improved multi-use hard surface wetting and sheeting, quick drying, uniform drying, soil removal, self-cleaning, anti-spotting, anti-soil deposition, cleaner appearance, enhanced gloss, enhanced color, minor surface defect repair, improved smoothness, anti-hazing properties, modification of surface friction, release of actives, reduced damage to abrasion and improved transparency.

Product with Instructions for Use

The present invention also encompasses the inclusion of instructions on the use of the coating compositions of the present invention with the packages containing the coating compositions herein or with other forms of advertising associated with the sale or use of the coating compositions. The instructions may be included in any manner typically used by consumer product manufacturing or supply companies. Examples include providing instructions on a label attached to the container holding the coating composition; on a sheet either attached to the container or accompanying it when purchased; or in advertisements, demonstrations, and/or other written or oral instructions which may be connected to the purchase or use of the coating compositions.

Specifically the instructions will include a description of the use of the coating composition, for instance, the recommended amount of composition to use in order to coat the hard surface or article the recommended amount of composition to apply to the hard surface; if spraying, soaking or rubbing is appropriate.

The coating compositions of the present invention are alternatively included in a product. The product alternatively comprises a hard surface coating composition in accordance with the present invention, and further comprises instructions for using the product to launder hard surfaces by contacting a hard surface in need of treatment with an effective amount of the coating composition such that the coating composition imparts one or more desired hard surface coating benefits to the hard surface.

The following examples are illustrative of the present invention, but are not meant to limit or otherwise define its scope. All parts, percentages and ratios used herein are expressed as percent weight unless otherwise specified.

The compositions and methods of the present invention can be used for industrial modification of hard surfaces, such as in automotive and building component manufacturing.

EXAMPLE(S)

The following provides several non-limiting examples of the present invention.

Example 1

A composition comprising 68 grams of URECLEAR® clearcoat obtained from BASF Corporation of Southfield, Mich., USA is combined with 0.1 to 25 grams of a nanoclay, such as Laponite™, a synthetic hectorite clay obtained from Southern Clay Products, Inc. of Gonzales, Tex., USA. These two components are mixed under agitation, and 15 grams of methyl isoamylketone methyl-2-hexanone is added.

The clearcoat composition is sprayed wet-on-wet over a high solids basecoat onto electocoated primed automotive body panels. The panels are flashed at ambient temperatures for 10 minutes and then cured for 20 minutes at 270° F. (132.20° C.).

Examples 2–15

Liquid coating compositions, according to the present invention, are as follows where the balance is water:

TABLE 1

| Example # | Nanoparticle (Wt %) | Surfactant (Wt %) |
|---|---|---|
| 2 | Nanoclay (0.1) | Neodol 91-6 (0.075) |
| 3 | Nanoclay (0.05) | Neodol 91-6 (0.075) |
| 4 | Nanoclay (0.05) | Silwet L-77 (0.025) |
| 5 | Nanoclay (0.1) | Q2-5211 (0.025) |
| 6 | Nanoclay (0.05) | Q2-5211 (0.025) |
| 7 | Nanoclay (0.03) | Q2-5211 (0.1) |
| 8 | Nanoclay (0.1) | Tergitol 15-S-9 (0.1) |
| 9 | Nanoclay (0.1) | Tergitol NP-9 (0.1) |
| 10 | Nanoclay (0.1) | Neodol 91-8 (0.075) |
| 11 | Nanoclay (0.1) | Component A (0.2) |
| 12 | Nanoclay (0.2) | Component A (0.2) |

TABLE 1-continued

| Example # | Nanoparticle (Wt %) | Surfactant (Wt %) |
|---|---|---|
| 13 | Nanoclay (0.1) | Component B (0.2) |
| 14 | Nanoclay (0.1) | Neodol 91-6 (0.075) |
| 15 | Disperal P2 ™ (0.1) | Neodol 91-6 (0.075) |

1. Nanoclay can be any of the available synthetic hectorite clays, such as Laponite ™ available from Southern Clay Products, Inc.
2. Disperal P2 ™ is boehmite alumina from Condea, Inc.

Examples 16–19

In the following examples, dispersants were formulated with the nanoclay and surfactant to allow the hard surface coating composition to be made with tap water:

TABLE 2

| Example # | Nanoparticle (Wt %) | Surfactant (Wt %) | Dispersant (Wt %) |
|---|---|---|---|
| 16 | Nanoclay (0.1) | Neodol 91-6 (0.075) | Polyacrylate 4500 MW (0.02) |
| 17 | Nanoclay (0.1) | Neodol 91-6 (0.075) | Poly (acrylic/maleic)[2] (0.02) |
| 18 | Nanoclay (0.1) | Neodol 91-6 (0.075) | Polyacrylate 2000 MW (0.02) |
| 19 | Nanoclay (0.1) | Neodol 91-6 (0.075) | STPP (0.02) |

[1]Nanoclay can be any of the available synthetic hectorite clays, such as Laponite B ™ from Southern Clay Products, Inc.
[2]MA:AA = 4:6, MW = 11,000.

Examples 20–27

Liquid coating compositions, according to the present invention, where the balance is water, and where said coating composition can be applied to surface, optionally the said coating composition is diluted with water to achieve a concentrated coating composition of 0.1% nanoparticle are as follows:

TABLE 3

| Example # | Nanoparticle (Wt %) | Surfactant (Wt %) | Dispersant (Wt %) |
|---|---|---|---|
| 20 | Nanoclay (1.6) | Q2-5211 (0.8) | None |
| 21 | Nanoclay (0.8) | Q2-5211 (0.4) | None |
| 22 | Nanoclay (0.8) | Neodol 91-6 (0.6) | None |
| 23 | Disperal P2 ™ (10) | Neodol 91-6 (7.5) | None |
| 24 | Nanoclay (5.0) | Neodol 91-6 (3.75) | Polyacrylate 4500 MW (1.0) |
| 25 | Nanoclay (5.0) | Neodol 91-6 (3.75) | Poly (acrylic/maleic)[3] (1.0) |
| 26 | Nanoclay (1.0) | Neodol 91-6 (0.75) | Polyacrylate 4500 MW (0.2) |
| 27 | Nanoclay (1.0) | Neodol 91-6 (0.75) | Polyacrylate 4500 MW (0.1) |

[1]Nanoclay can be any of the available synthetic hectorite clays, such as Laponite ™ availablle from Southern Clay Products, Inc.
[2]Disperal P2 ™ is boehmite alumina from Condea, Inc.
[3]MA:AA = 4:6, MW = 11,000.

Panels were treated with 0.1% nanoclay/0.075% Neodol 91-6 surfactant using a Solo sprayer and air-dried vertically. Panels were heated in an oven at the temperatures specified in Table 1 for 25 min., and then allowed to cool. Post-heat performance was assessed, panels were scrubbed (Sheen Wet Abrasion Scrub Tester, 500 g total wt., sponges saturated with dilute DAWN® dishwashing liquid solution), and performance was reassessed. Contact angle measurements were taken before heating, after heating, and after scrubbing. A Miniscan XE with C/2° illuminant (Hunter Associates Laboratory, Inc., Reston, Va., USA) was used to measure panel color (CIE L*a*b* color scale) after heating. Some panels were treated with thionin cationic dye (500 ppm) to visually assess the coating compositions' longevity. Results

TABLE 4

Heating Profile—Performance and Removability[a]

| Temperature (° C.) | | Performance After Heating (25 min.) | Sheeting/Curtaining Lasts Through: (0, 10, 50, 100, 500 scrubs) |
|---|---|---|---|
| 22 | Ambient | Sheeting | <10 scrubs |
| 60 | Baking temp used in aftermarket coating applications | Sheeting | <10 scrubs |
| 80–110 | Low end baking temp used by Original equipment manufacturers (OEM's) (80° C.) | Curtaining | <50 scrubs |
| 135 | | Curtaining | <100 scrubs |
| 148 | | Curtaining | 500 scrubs |
| 160 | High end baking temp used by OEM's | Curtaining | 500 scrubs |

[a]black panels, cured 3 days

Examples 28–29

Liquid hard surface coating compositions, according to the present invention, placed in a spray bottled and delivered as a spray-on formula for improved tough food soil release benefits on hard surfaces are as follows:

TABLE 5

| | | % by weight | |
|---|---|---|---|
| | Component | 28 | 29 |
| 1. | Nanoclay | 0.005–2 | 0.005–2 |
| 2. | Ether capped poly(oxyalkylated) alcohol | — | 0.01–1 |
| 3. | Water | Balance | Balance |

1. Nanoclay can be any of the available synthetic hectorite clays, such as Laponite RD ™ or B ™ from Southern Clay Products, Inc.
2. Ether capped poly(oxyalkylated) alcohol acts as a nonionic wetting agent.
3. Water is used for balance.

The above coating compositions when applied to a hard surface, modifies the hard surface to exhibit at least one of the following multi-use benefits consisting of improved hard surface: wetting and sheeting, quick drying, uniform drying, soil removal, self-cleaning, anti-spotting, anti-soil deposition, cleaner appearance, enhanced gloss, enhanced color, minor surface defect repair, smoothness, anti-hazing, modification of surface friction, release of actives, reduced damage to abrasion and transparency; as compared to a hard surface not treated with said hard surface coating composition.

In certain aspects, the hard surface coating has a transmittance to light of greater than or equal to about 75% measured according to the Transmittance Test. That is, in such an aspect, at least 75% of the incident light is transmitted through the hard surface coating, and 25% of the incident light will not be transmitted through the hard surface coating. In another aspect, the hard surface coating has a transparency such that the surface coated with the hard surface coating appears to the unaided human eye to be substantially unaltered in comparison to a surface that has not been coated with the hard surface coating.

It is also possible that the coatings described herein could potentially provide other benefits. It is believed, subject to confirmation, that the coatings described herein could potentially be useful in reducing drag on moving articles such as skis, and moving vehicles, such as automobiles, aircraft, watercraft, and the like, and in preventing the buildup of material on hard surfaces, such as preventing the buildup of ice on airplane wings and preventing the buildup of deposits such as scale on the inside of pipes in order to facilitate transport of fluids. One non-limiting example of a preventative purpose for the coating would be to utilize the coating composition in the nature of a drain cleaner. Such a composition can be poured into drain pipes to prevent the build up, or further build up, of deposits in the pipes.

In the case of any of the embodiments described in this detailed description, unless specified otherwise, the coating can be applied to the hard surface with or without the active curing step. It is understood that the active curing step is useful because it is believed to provide the coating with additional durability. The coatings described herein can be applied at any suitable time in the life of the hard surface including during or after manufacture of the hard surface, if it is a type of hard surface that is manufactured. The coating can also be applied during the life of the hard surface for protective purposes, preventative purposes, or any other purposes.

Test Methods

Unless otherwise stated, all tests are performed under standard laboratory conditions (50% humidity and at 73° F. (23° C.)).

Procedure for Measurement of Durability of Coating

Procedure:
1. Clean surface: 4"×12" auto panels are used as received with desired coating applied. If X-ray fluorescence (XRF) analysis is performed, panels are cut into 1"×1.5" (2.5×3.8 cm) rectangles, and cleaned by an ethanol rinse, followed by washing with DAWN® dishwashing liquid available from The Procter & Gamble Company of Cincinnati, Ohio, USA wash and deionized water rinse prior to use in the scrub test.
2. Apply product with hand pump sprayer until auto panel is completely wet, allow to air dry (2 hr. minimum).
3. Heat in oven for 25 min. (at desired temperature, e.g., one of the temperatures listed in Table 4), allow to cool to room temperature.
4. Measure contact angle.
5. Assess visual performance.
6. Perform scrub test.
7. Assess visual performance.
8. Measure contact angle once panel has dried.
9. Perform dye or XRF analysis.

Auto Panel Specifications: Test panels, primer and basecoat compositions are obtained from ACT Laboratories, Inc. (Hillsdale, Mich., USA). Their preparation method is as follows. The primer is sprayed on in two coats with no flash time between coats. Primer then flashes for 10 min. Substrates are baked in an oven for 30 min. at 265° F. (129° C.) (this temperature is the substrate, or panel, temperature). Film build range=0.9–1.1 mils (22.9 to 27.9 μm). Once the primer has cooled, the basecoat is applied in two coats with 60 sec. flash between coats, for a film build of 0.6–0.8 mils (15.2 to 20.3 μm). Basecoat is flashed for 2 min. before the URECLEAR® clearcoat is applied in two coats with 60 sec. flash between coats, to a film build of 1.9–2.1 mils (48.3 to 53.3 μm). The hard surface coating can be applied to the panels at any stage of the process as shown in FIG. 4. The panels are then flashed 20 min. prior to final oven bake: 10 min. at 180° F. (82° C.), then temperature is ramped up to 270° F. (132° C.) for 25 min. (substrate temperature).

Visual Performance Assessment

The substrate is rinsed with water, while the panel is held at a 90° angle to horizontal, and the panel is judged to determine whether it exhibits sheeting, curtaining, or beading. "Sheeting" is when an even film of water covers the substrate, and slowly dries down without developing breaks in the film. "Curtaining" occurs when the water slowly pulls into the middle and drains off the substrate. Performance is judged to be "beading" when the water shows no affinity for the surface, and quickly runs off the substrate.

Scrub Method for Measurement of Durability

Sheen Wet Abrasion Scrub Tester (Model 903PG. Sheen Instruments Ltd., Kingston, England) is fitted with 4–3.25"× 1.5"×1.75" (8.25 cm×3.8 cm×4.4 cm) sponges saturated with 30 mL of 0.2% DAWN® dishwashing liquid in deionized water with 10 grains per gallon added hardness (3:1 molar ratio $Ca^{2+}$:$Mg^{2+}$). The instrument is set to 30 cycles per minute, with 200 g weights on each of the 300 g carrier arms for a total of 500 g per carrier arm. Scrub levels: 0, 10, 50, 100, 500 scrubs.

Contact Angle

Deionized water (25 μL) is pipetted onto the coated substrate, and contact angle is measured using a goniometer (NRL C.A.Model #100–00 115 from Reme-Hart Inc., Mountain Lakes, N.J., USA, with Olympus TGHM light source, Olympus Optical Co., Ltd., Japan) Three measurements are made and averaged for each sample tested.

Dye Analysis

Only white surfaces can be used for this analysis. The surface is thoroughly rinsed with a solution of thionin cationic dye (500 ppm in deionized water), followed by a rinse with water to remove excess dye. An untreated surface of the same type is used as a control. The surface coverage of the synthetic hectorite coating can be assessed qualitatively by visual evaluation or by Hunter Miniscan XE measurements.

X-Ray Fluorescence Analysis

X-Ray Fluorescence (XRF) is a nondestructive and noninvasive technique that assesses the concentration of elements in a sample or on the surface of a sample. The analysis is performed using a Phillips Analytical, 12 Michigan Dr. Natick, Mass. 01760, USA, PW2404 Sequential "4000W" X-Ray Spectrometer System, Serial No. DY735. The instrument settings and specifications for XRF analysis are set out in Table 6 below.

Measurement Procedure:
1) Calibration curves that relate instrument response to analyte concentration can be constructed by pipetting known concentrations of standards on the desired substrate. Standards are allowed to slowly dry before measurements are performed.
2) The standard or sample is assayed by placing the sample face down in a sample cup, loading the sample cup into the spectrometer, and initiating the data acquisition sequence. In the case of synthetic hectorite coatings, the element lines for Mg and Si are measured whereas the element line for Al is used for aluminum oxide coating.
3) Concentration for samples are determined from the calibration curve for standards.

TABLE 6

| General conditions used on automobile surfaces | |
|---|---|
| Sample Chamber Environment | Vacuum |
| Collimator mask size | 16 mm |
| Collimator size | 700 μm |
| Volatage | 32 kV |
| Current | 125 mA |
| Detector type | Goniometer |
| Analysis time | 30 sec. |
| Element line assayed | Ka1 for desired element |
| Sample Spinner | On |
| Tube Type | Rhodium |

Transmittance Test

Transmittance is measured using ASTM method D 1003-00. Transmittance is expressed as a percentage that represents the amount of incident light that passes through the article that is tested.

Viscosity Test

All measurements were performed with a Brookfield RVDV II+ rotational viscometer available from Brookfield Engineering Labs, Inc., Stoughton, Mass., USA. The recommended procedure is followed, with the following exceptions. The recommended procedure is varied by using a smaller vessel and removing the guard leg. The calibration is to be determined using a 600 ml low form griffin type beaker with Glycerin (1400 cp) and olive oil (80 cp) at 100 RPM. All subsequent measurements are performed in 50 ml beakers at 100 RPM with the appropriate spindle.

While particular embodiments of the subject invention have been described, it will be obvious to those skilled in the art that various changes and modifications of the subject invention can be made without departing from the spirit and scope of the invention. It is intended to cover, in the appended claims, all such modifications that are within the scope of the invention.

What is claimed is:

1. A method of forming a substantially clear hard surface coating on an automobile body panel, said method comprising:
   (a) applying a material for coating a hard surface to an automobile body panel, said material comprising an effective amount of non-photoactive nanoparticles; and
   (b) actively curing said material on the automobile body panel;
   wherein the material is substantially free of a binder.

2. The method of claim 1 wherein a substantially clear, hydrophilic coating is formed on said automobile body panel.

3. The method of claim 1 wherein the step (a) of applying a material for coating a hard surface comprises applying a plurality of non-photoactive nanoparticles directly to said automobile body panel.

4. The method of claim 1 wherein the step (a) of applying a material for coating a hard surface comprises applying a plurality of non-photoactive nanoparticles to said automobile body panel through the use of a carrier medium.

5. The method of claim 4 wherein the carrier medium is a gas.

6. The method of claim 4 wherein the carrier medium comprises a liquid.

7. The method of claim 6 wherein the carrier medium is aqueous.

8. The method of claim 6 wherein the carrier medium is nonaqueous.

9. The method of claim 1 wherein the material applied in step (a) comprises a hard surface coating composition comprising an effective amount of non-photoactive nanoparticles and a carrier medium.

10. The method of claim 3 wherein said automobile body panel is charged to facilitate attraction and adherence of said non-photoactive nanoparticles thereto.

11. The method of claim 1 wherein the step (b) of actively curing said material on said automobile body panel comprises thermally curing said material.

12. The method of claim 1 wherein the material applied in step (a) comprises an agent that is incorporated therein for accelerating the curing of the material, and the step (b) of actively curing the material comprises allowing said agent to cure said material.

13. The method of claim 9 wherein the hard surface coating composition in step (a) comprises a pre-mixed solution of the non-photoactive nanoparticles and the carrier medium.

14. The method of claim 9 wherein the hard surface coating composition in step (a) is formed by: (i) providing a concentrated hard surface coating composition; and (ii) diluting said concentrated hard surface coating composition.

15. The method of claim 14 wherein the step (ii) comprises diluting said concentrated hard surface composition with deionized water.

16. The method of claim 14 wherein the hard surface coating composition comprises a dispersing agent, and the step (ii) comprises diluting said concentrated hard surface composition with tap water.

17. The method of claim 11 wherein the material is applied at an ambient temperature, and the step (b) of thermally curing said material comprises heating the air surrounding said material and said, automobile body panel to a temperature of greater than ambient temperature.

18. The method of claim 11 wherein the step (b) of thermally curing said material comprises heating the air surrounding said material and said automobile body panel to a temperature of greater than or equal to about 50° C.

19. The method of claim 17 wherein the air surrounding said material is heated to a temperature of no greater than about 180° C.

20. The method of claim 1 wherein said automobile body panel has an appearance, and the appearance of said automobile body panel remains substantially unchanged after inspection to the unaided human eye after said material is cured.

21. The method of claim 1 wherein the surface with the hard surface coating thereon has a transmittance to light of greater than or equal to about 75%.

22. The method of claim 9 wherein the concentration of nanoparticles in said coating composition prior to application to said automobile body panel is less than about 50% by weight of the coating composition.

23. The method of claim 9 wherein the coating composition is in the form of a liquid for spray on application, and the concentration of nanoparticles in said coating composition prior to application to said automobile body panel is less than about 20% by weight of the coating composition.

24. The method of claim 9 wherein the coating composition is in the form of a liquid for spray on application, and the concentration of nanoparticles in said coating composition prior to application to said automobile body panel is less than about 0.5% by weight of the coating composition.

25. The method of claim 9 wherein the viscosity of said coating composition is less than or equal to about 1,000 Cps.

26. The method of claim 9 wherein the viscosity of said coating composition is less than or equal to about 100 Cps.

27. The method of claim 9 wherein the viscosity of said coating composition is less than or equal to about 40 Cps.

28. The method of claim 1 which is applied prior to, during, or after a process of painting and/or applying a clear coat to the automobile body panel.

29. The method of claim 28 wherein said process comprises painting and subsequently applying a clear coat to the automobile body panel, and comprises one or more of the steps of:

(i) applying one or more coats of primer to the automobile body panel;

(ii) applying one or more coats of paint to the automobile body panel;

(iii) applying one or more coats of clear coat to the automobile body panel; and (iv) heating the automobile body panel after any of one or more of said coats of primer, coats of paint, or coats of clear coat are applied.

30. The method of claim 29 wherein the material is applied after said one or more coats of paint are applied to the automobile body panel.

31. The method of claim 29 wherein the material is applied during the step (iii) of applying one or more coats of clear coat to the automobile body panel.

32. The method of claim 29 wherein the material is applied after said one or more coats of clear coat are applied to the automobile body panel.

* * * * *

UNITED STATES PATENT AND TRADEMARK OFFICE
CERTIFICATE OF CORRECTION

PATENT NO.    : 6,955,834 B2
DATED         : March 11, 2003
INVENTOR(S)   : Robert Henry Rohrbaugh et al.

It is certified that error appears in the above-identified patent and that said Letters Patent is hereby corrected as shown below:

<u>Title page,</u>
Insert Item -- [30], Foreign Application Priority Data,
United States of America PCT/US00/16349, filed on 6/14/2000. --.

Signed and Sealed this

Tenth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,955,834 B2
DATED : October 18, 2005
INVENTOR(S) : Robert Henry Rohrbaugh et al.

It is certified that error appears in the above-identified patent and that said Letters Patent is hereby corrected as shown below:

Title page,
Insert Item -- [30] Foreign Application Priority Data
United States of America PCT/US00/16349, filed on 9/14/2000. --.

This certificate supersedes Certificate of Correction issued January 10, 2006.

Signed and Sealed this

Seventh Day of February, 2006

JON W. DUDAS
*Director of the United States Patent and Trademark Office*